US012795124B2

(12) United States Patent
Kim et al.

(10) Patent No.: US 12,795,124 B2
(45) Date of Patent: Nov. 10, 2026

(54) METHOD AND APPARATUS FOR FEATURE ENCODING/DECODING ON BASIS OF CORRELATION BETWEEN CHANNELS, AND RECORDING MEDIUM HAVING BITSTREAM STORED THEREIN

(71) Applicant: LG Electronics Inc., Seoul (KR)

(72) Inventors: Chulkeun Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 171 days.

(21) Appl. No.: 18/684,369

(22) PCT Filed: Aug. 18, 2022

(86) PCT No.: PCT/KR2022/012369

§ 371 (c)(1),
(2) Date: Feb. 16, 2024

(87) PCT Pub. No.: WO2023/022543

PCT Pub. Date: Feb. 23, 2023

(65) Prior Publication Data

US 2024/0430454 A1 Dec. 26, 2024

(30) Foreign Application Priority Data

Aug. 18, 2021 (KR) ........................ 10-2021-0108903
Oct. 26, 2021 (KR) ........................ 10-2021-0143952

(51) Int. Cl.
*H04N 19/00* (2014.01)
*H04N 19/105* (2014.01)
(Continued)

(52) U.S. Cl.
CPC ......... *H04N 19/184* (2014.11); *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS 10,733,767 B2 * 8/2020 Cho ..................... G06N 3/0495
10,785,681 B1 * 9/2020 Ge ........................ G06F 18/253
(Continued)

FOREIGN PATENT DOCUMENTS

KR 1020090129926 A 12/2009
KR 101335832 B1 12/2013
(Continued)

*Primary Examiner* — Zhihan Zhou
(74) *Attorney, Agent, or Firm* — Fish & Richardson P.C.

(57) ABSTRACT

Provided are a method and an apparatus for feature encoding/decoding, and a computer-readable recording medium generated by the feature encoding method. A feature decoding method may comprise the steps of: obtaining, from a bitstream, first information about whether or not a plurality of channels included in a current feature map are rearranged; obtaining, from the bitstream, second information about a rearrangement unit of the plurality of channels on the basis that the first information indicates that the plurality of channels are arranged; obtaining, from the bitstream, third information about a sequence in which the plurality of channels are reconstructed on the basis of the rearrangement unit of the plurality of channels determined on the basis of the second information; and reconstructing the plurality of channels on the basis of the sequence in which the plurality of channels are reconstructed, the sequence being determined on the basis of the third information.

8 Claims, 26 Drawing Sheets

(51) Int. Cl.

| | |
|---|---|
| ***H04N 19/159*** | (2014.01) |
| ***H04N 19/176*** | (2014.01) |
| ***H04N 19/184*** | (2014.01) |

(56) References Cited

U.S. PATENT DOCUMENTS

2015/0146796 A1* 5/2015 Chen .................... H04N 19/172
375/240.24
2016/0309180 A1* 10/2016 Nakamura ........... H04N 19/176
2018/0350110 A1* 12/2018 Cho ..................... G06N 3/0464
2018/0365794 A1* 12/2018 Lee ........................ G06N 3/045

FOREIGN PATENT DOCUMENTS

KR 1020180131073 A 12/2018
KR 1020210100123 A 8/2021

* cited by examiner

NUMBER OF CHANNELS 64

RANGE OF VALUE (-∞, ∞)

DATA TYPE 32-BIT FLOATING POINT

<64-channel feature set>

FIG. 15a

| |
|---|
| Feature_sequence_parameter_set( ) { |
| ... |
| **Feature_channel_reordering_flag** |
| ... |
| } |

FIG. 15b

| |
|---|
| Feature_sequence_parameter_set( ) { |
| ... |
| **Feature_channel_reordering_flag** |
| If( Feature_channel_reordering_flag){ |
| **Picture_level_channel_reordering_flag** |
| If(!Picture_level_channel_reodering_flag){ |
| **Group_level_channel_reordering_flag** |
| } |
| } |
| ... |
| } |

FIG. 16a

| |
|---|
| Feature_picture_parameter_set( ) { |
| ... |
| If(Feature_channel_reordering_flag ){ |
| **Picture_level_channel_reodering_flag** |
| } |
| If(Picture_level_channel_reordering_flag){ |
| **Number_of_channel** |
| for( i = 0; i < Number_of_channel; i++ ){ |
| **Feature_channel_order_count[ i ]** |
| } |
| } |
| ... |
| } |

FIG. 16b

| |
|---|
| Feature_picture_parameter_set( ) { |
| … |
| If(Feature_channel_reordering_flag ){ |
| **Picture_level_channel_reordering_flag** |
| } |
| If(Picture_level_channel_reordering_flag){ |
| **Number_of_channel** |
| for( i = 0; i < Number_of_channel; i++ ) { |
| **Feature_channel_order_count[ i ]** |
| } |
| } |
| Else{ |
| **Group_level_channel_reordering_flag** |
| } |
| … |
| } |

FIG. 17a

| |
|---|
| Feature_group_parameter_set( ) { |
| … |
| If(Feature_channel_reordering_flag ){ |
| If(!Picture_level_channel_reordering_flag){ |
| **Group_level_channel_reordering_flag** |
| If(Group_level_Channel_reordering_flag){ |
| **Number_of_group_channel** |
| for( i = 0; i < Number_of_group_channel; i++ ) { |
| **Feature_channel_order_count[ i ]** |
| } |
| } |
| } |
| } |
| … |
| } |

FIG. 17b

| |
|---|
| Feature_group_parameter_set( ) { |
| … |
| If(Feature_channel_reordering_flag ){ |
| If(Group_level_channel_reordering_flag){ |
| **Number_of_group_channel** |
| for( i = 0; i < Number_of_group_channel; i++ ) { |
| **Feature_channel_order_count[ i ]** |
| } |
| } |
| } |
| … |
| } |

| |
|---|
| Feature parameter set( ) { |
| … |
| If(Feature channel reordering flag ){ |
| If(!Picture level channel reordering flag&& !Group level channel reordering flag){ |
| **Feature_channel_order_count** |
| } |
| } |
| … |
| } |

| |
|---|
| Feature coding unit( ) { |
| **inter_channel_prediction** |
| If(inter channel prediction){ |
| // inter channel prediction info signaling |
| }else { |
| // intra prediction info signaling |
| } |
| … |
| } |

FIG. 23

| |
|---|
| Feature_sequence_parameter_set( ) { |
| … |
| **PIC_flag** |
| if(PIC_flag){ |
| **MaxNumPICList** |
| **MaxNumInterChannelCandidate** |
| **MaxNumSpatialCandidate** |
| **InterChannelCandidataPriority_flag** |
| **SpatialCandidataPriority_flag** |
| … |
| } |

| |
|---|
| Feature_Coding( x0, y0,channel_number ) { |
| ... |
| if(PIC_flag){ |
| If(Pred_mode == PIC_mode) { |
| **PIC_idx[channel_number ][x0][y0]** |
| } |
| } |
| ... |
| } |

| |
|---|
| Feature_Coding( x0, y0,channel_number ) { |
| ... |
| if(PIC_flag){ |
| If(PIC_Pred_flag) { |
| **PIC_idx[channel_number ][x0][y0]** |
| } |
| } |
| ... |
| } |

METHOD AND APPARATUS FOR FEATURE ENCODING/DECODING ON BASIS OF CORRELATION BETWEEN CHANNELS, AND RECORDING MEDIUM HAVING BITSTREAM STORED THEREIN

CROSS-REFERENCE TO RELATED APPLICATIONS

This application is a National Stage application under 35 U.S.C. § 371 of International Application No. PCT/KR2022/012369, filed on Aug. 18, 2022, which claims the benefit of Korean Patent Application No. 10-2021-0108903, filed on Aug. 18, 2021, and Korean Patent Application No. 10-2021-0143952, filed on Oct. 26, 2021. The disclosures of the prior applications are incorporated by reference in their entirety.

TECHNICAL FIELD

The present disclosure relates to a feature encoding/decoding method and apparatus, and more specifically, to a feature encoding/decoding method and apparatus based on correlation between channels, and a recording medium storing a bitstream generated by the feature encoding method/decoding apparatus of the present disclosure.

BACKGROUND

With the development of machine learning technology, demand for image processing-based artificial intelligence services is increasing. In order to effectively process a vast amount of image data required for artificial intelligence services within limited resources, image compression technology optimized for machine task performance is essential. However, existing image compression technology has been developed with the goal of high-resolution, high-quality image processing for human vision, and has the problem of being unsuitable for artificial intelligence services. Accordingly, research and development on new machine-oriented image compression technology suitable for artificial intelligence services is actively underway.

SUMMARY

An object of the present disclosure is to provide a feature encoding/decoding method and apparatus with improved encoding/decoding efficiency.

Additionally, the present disclosure is to provide a feature encoding/decoding method and apparatus based on correlation between channels.

Additionally, the present disclosure is to provide a feature encoding/decoding method and apparatus based on channel reordering.

Additionally, the present disclosure is to provide a feature encoding/decoding method and apparatus based on inter-channel intra prediction.

Additionally, the present disclosure is to provide a feature encoding/decoding method and apparatus based on inter-channel inter prediction.

Another object of the present disclosure is to provide a method of transmitting a bitstream generated by a feature encoding method or apparatus.

Another object of the present disclosure is to provide a recording medium storing a bitstream generated by a feature encoding method or apparatus according to the present disclosure.

Another object of the present disclosure is to provide a recording medium storing a bitstream received, decoded and used to reconstruct a feature by a feature decoding apparatus according to the present disclosure.

The technical problems solved by the present disclosure are not limited to the above technical problems and other technical problems which are not described herein will become apparent to those skilled in the art from the following description.

A feature decoding method according to an aspect of the present disclosure may comprise acquiring first information about whether to reorder a plurality of channels included in a current feature map from a bitstream, acquiring second information about a reordering unit of the plurality of channels from the bitstream, based on the first information indicating that the plurality of channel is reordered, acquiring third information about a reconstruction order of the plurality of channels from the bitstream, based on the reordering unit of the plurality of channels determined based on the second information, and reconstructing the plurality of channels based on the reconstruction order of the plurality of channels determined based on the third information.

A feature decoding apparatus according to another aspect of the present disclosure may comprise a memory and at least one processor. The at least one processor may acquire first information about whether to reorder a plurality of channels included in a current feature map from a bitstream, acquire second information about a reordering unit of the plurality of channels from the bitstream, based on the first information indicating that the plurality of channel is reordered, acquire third information about a reconstruction order of the plurality of channels from the bitstream, based on the reordering unit of the plurality of channels determined based on the second information, and reconstruct the plurality of channels based on the reconstruction order of the plurality of channels determined based on the third information.

A feature encoding method according to another aspect of the present disclosure may comprise determining whether to reorder a plurality of channels included in a current feature map, determining a reordering unit of the plurality of channels based on it being determined that the plurality of channels is reordered, reordering the plurality of channels based on the determined reordering unit, and encoding the plurality of reordered channels and the reordering-related information. The reordering-related information may comprise first information about whether to reorder the plurality of channels, second information about the determined reordering unit and third information about the order before the reordering of the plurality of channels.

A feature encoding method according to another aspect of the present disclosure may comprise a memory and at least one processor. The at least one processor may determine whether to reorder a plurality of channels included in a current feature map, determining a reordering unit of the plurality of channels based on it being determined that the plurality of channels is reordered, reorder the plurality of channels based on the determined reordering unit, and encode the plurality of reordered channels and the reordering-related information. The reordering-related information may comprise first information about whether to reorder the plurality of channels, second information about the determined reordering unit and third information about the order before the reordering of the plurality of channels.

In addition, a recording medium according to another aspect of the present disclosure may store a bitstream generated by the feature encoding apparatus or the feature encoding method of the present disclosure.

In addition, a transmission method according to another aspect of the present disclosure may transmit a bitstream generated by the feature encoding apparatus or the feature encoding method of the present disclosure to a feature decoding apparatus.

The features briefly summarized above with respect to the present disclosure are merely exemplary aspects of the detailed description below of the present disclosure, and do not limit the scope of the present disclosure.

According to the present disclosure, it is possible to provide a feature encoding/decoding method and apparatus with improved encoding/decoding efficiency Also, according to the present disclosure, it is possible to provide an image encoding/decoding method and apparatus based on correlation between channels.

Also, according to the present disclosure, it is possible to provide an image encoding/decoding method and apparatus based on channel reordering.

Also, according to the present disclosure, it is possible to provide an image encoding/decoding method and apparatus based on inter-channel intra prediction.

Also, according to the present disclosure, it is possible to provide an image encoding/decoding method and apparatus based on inter-channel inter prediction.

Also, according to the present disclosure, it is possible to provide a method of transmitting a bitstream generated by a feature image encoding method or apparatus according to the present disclosure.

Also, according to the present disclosure, it is possible to provide a recording medium storing a bitstream generated by a feature encoding method or apparatus according to the present disclosure.

Also, according to the present disclosure, it is possible to provide a recording medium storing a bitstream received, decoded and used to reconstruct a feature by a feature decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIGS. 15*a* and 15*b* are diagrams showing an example of feature sequence parameter sets according to an embodiment of the present disclosure.

FIGS. 16*a* and 16*b* are diagrams showing an example of feature picture parameter sets according to an embodiment of the present disclosure.

FIGS. 17*a* and 17*b* are diagrams showing an example of feature picture parameter sets according to an embodiment of the present disclosure.

FIG. 23 is a diagram illustrating an example of a feature sequence parameter set according to an embodiment of the present disclosure.

DETAILED DESCRIPTION

Figure 1:
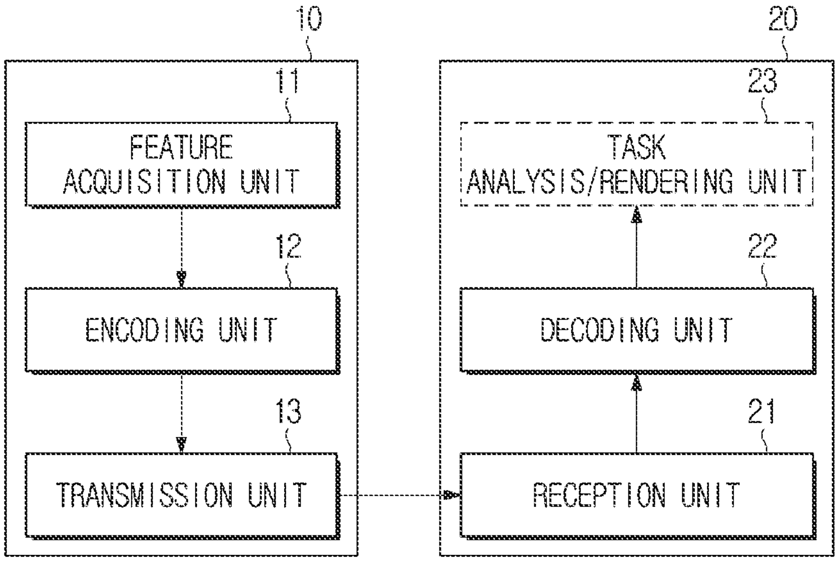
FIG. 1 is a view schematically showing a VCM system to which embodiments of the present disclosure are applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, in case it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

The present disclosure may be applied to a method disclosed in a Versatile Video Coding (VVC) standard and/or a Video Coding for Machines (VCM) standard. In addition, the present disclosure may be applied to a method disclosed in an essential video coding (EVC) standard, AOMedia Video(AV1) standard, 2nd generation of audio video coding standard (AVS2), or a next-generation video/image coding standard (e.g., H.267 or H.268, etc.).

This disclosure provides various embodiments related to video/image coding, and, unless otherwise stated, the embodiments may be performed in combination with each other. In the present disclosure, "video" refers to a set of a series of images according to the passage of time. An "image" may be information generated by artificial intelligence (AI). Input information used in the process of performing a series of tasks by AI, information generated during the information processing process, and the output information may be used as images. In the present disclosure, a "picture" generally refers to a unit representing one image in a specific time period, and a slice/tile is a coding unit constituting a part of a picture in encoding. One picture may be composed of one or more slices/tiles. In addition, a slice/tile may include one or more coding tree units (CTUs). The CTU may be partitioned into one or more CUs. A tile is a rectangular region present in a specific tile row and a specific tile column in a picture, and may be composed of a plurality of CTUs. A tile column may be defined as a rectangular region of CTUs, may have the same height as a picture, and may have a width specified by a syntax element signaled from a bitstream part such as a picture parameter set. A tile row may be defined as a rectangular region of CTUs, may have the same width as a picture, and may have a height specified by a syntax element signaled from a bitstream part such as a picture parameter set. A tile scan is a certain continuous ordering method of CTUs partitioning a picture. Here, CTUs may be sequentially ordered according to a CTU raster scan within a tile, and tiles in a picture may be sequentially ordered according to a raster scan order of tiles of the picture. A slice may contain an integer number of complete tiles, or may contain a continuous integer number of complete CTU rows within one tile of one picture. A slice may be exclusively included in a single NAL unit. One picture may be composed of one or more tile groups. One tile group may include one or more tiles. A brick may indicate a rectangular region of CTU rows within a tile in a picture. One tile may include one or more bricks. The brick may refer to a rectangular region of CTU rows in a tile. One tile may be split into a plurality of bricks, and each brick may include one or more CTU rows belonging to a tile. A tile which is not split into a plurality of bricks may also be treated as a brick.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In an embodiment, especially when applied to VCM, when there is a picture composed of a set of components having different characteristics and meanings, a pixel/pixel value may represent a pixel/pixel value of a component generated through independent information or combination, synthesis, and analysis of each component. For example, in RGB input, only the pixel/pixel value of R may be represented, only the pixel/pixel value of G may be represented, or only the pixel/pixel value of B may be represented. For example, only the pixel/pixel value of a luma component synthesized using the R, G, and B components may be represented. For example, only the pixel/pixel values of images and information extracted through analysis of R, G, and B components from components may be represented.

In the present disclosure, a "unit" may represent a basic unit of image processing. The unit may include at least one of a specific region of the picture and information related to the region. One unit may include one luma block and two chroma (e.g., Cb and Cr) blocks. The unit may be used interchangeably with terms such as "sample array", "block" or "area" in some cases. In a general case, an M×N block may include samples (or sample arrays) or a set (or array) of transform coefficients of M columns and N rows. In an embodiment, In particular, especially when applied to VCM, the unit may represent a basic unit containing information for performing a specific task.

In the present disclosure, “current block” may mean one of “current coding block”, “current coding unit”, “coding target block”, “decoding target block” or “processing target block”. When prediction is performed, “current block” may mean “current prediction block” or “prediction target block”. When transform (inverse transform)/quantization (dequantization) is performed, “current block” may mean “current transform block” or “transform target block”. When filtering is performed, “current block” may mean “filtering target block”.

In addition, in the present disclosure, a “current block” may mean “a luma block of a current block” unless explicitly stated as a chroma block. The “chroma block of the current block” may be expressed by including an explicit description of a chroma block, such as “chroma block” or “current chroma block”.

In the present disclosure, the term “/” and “,” should be interpreted to indicate “and/or.” For instance. the expression “A/B” and “A, B” may mean “A and/or B.” Further, “A/B/C” and “A/B/C” may mean “at least one of A, B, and/or C.”

In the present disclosure, the term “or” should be interpreted to indicate “and/or.” For instance, the expression “A or B” may comprise 1) only “A”, 2) only “B”, and/or 3) both “A and B”. In other words, in the present disclosure, the term “or” should be interpreted to indicate “additionally or alternatively.”

The present disclosure relates to video/image coding for machines (VCM).

VCM refers to a compression technology that encodes/decodes part of a source image/video or information obtained from the source image/video for the purpose of machine vision. In VCM, the encoding/decoding target may be referred to as a feature. The feature may refer to information extracted from the source image/video based on task purpose, requirements, surrounding environment, etc. The feature may have a different information form from the source image/video, and accordingly, the compression method and expression format of the feature may also be different from those of the video source.

VCM may be applied to a variety of application fields. For example, in a surveillance system that recognizes and tracks objects or people, VCM may be used to store or transmit object recognition information. In addition, in intelligent transportation or smart traffic systems, VCM may be used to transmit vehicle location information collected from GPS, sensing information collected from LIDAR, radar, etc., and various vehicle control information to other vehicles or infrastructure. Additionally, in the smart city field, VCM may be used to perform individual tasks of interconnected sensor nodes or devices.

The present disclosure provides various embodiments of feature/feature map coding. Unless otherwise specified, embodiments of the present disclosure may be implemented individually, or may be implemented in combination of two or more.

Overview of VCM System

FIG. 1 is a diagram schematically showing a VCM system to which embodiments of the present disclosure are applicable.

Referring to FIG. 1, the VCM system may include an encoding apparatus 10 and a decoding apparatus 20

The encoding apparatus 10 may compress/encode a feature/feature map extracted from a source image/video to generate a bitstream, and transmit the generated bitstream to the decoding apparatus 20 through a storage medium or network. The encoding apparatus 10 may also be referred to as a feature encoding apparatus. In a VCM system, the feature/feature map may be generated at each hidden layer of a neural network. The size and number of channels of the generated feature map may vary depending on the type of neural network or the location of the hidden layer. In the present disclosure, a feature map may be referred to as a feature set.

The encoding apparatus 10 may include a feature acquisition unit 11, an encoding unit 12, and a transmission unit 13.

The feature acquisition unit 11 may acquire a feature/feature map for the source image/video. Depending on the embodiment, the feature acquisition unit 11 may acquire a feature/feature map from an external device, for example, a feature extraction network. In this case, the feature acquisition unit 11 performs a feature reception interface function. Alternatively, the feature acquisition unit 11 may acquire a feature/feature map by executing a neural network (e.g., CNN, DNN, etc.) using the source image/video as input. In this case, the feature acquisition unit 11 performs a feature extraction network function.

Depending on the embodiment, the encoding apparatus 10 may further include a source image generator (not shown) for acquiring the source image/video. The source image generator may be implemented with an image sensor, a camera module, etc., and may acquire the source image/video through an image/video capture, synthesis, or generation process. In this case, the generated source image/video may be sent to the feature extraction network and used as input data for extracting the feature/feature map.

The encoding unit 12 may encode the feature/feature map acquired by the feature acquisition unit 11. The encoding unit 12 may perform a series of procedures such as prediction. transform, and quantization to increase encoding efficiency. The encoded data (encoded feature/feature map information) may be output in the form of a bitstream. The bitstream containing the encoded feature/feature map information may be referred to as a VCM bitstream.

The transmission unit 13 may send feature/feature map information or data output in the form of a bitstream to the decoding apparatus 20 through a digital storage medium or network in the form of a file or streaming. Here, digital storage media may include various storage media such as USB, SD, CD, DVD, Blu-ray, HDD, and SSD. The transmission unit 13 may include elements for generating a media file with a predetermined file format or elements for transmitting data through a broadcasting/communication network.

The decoding apparatus 20 may acquire feature/feature map information from the encoding apparatus 10 and reconstruct the feature/feature map based on the acquired information.

The decoding apparatus 20 may include a reception unit 21 and a decoding unit 22

The reception unit 21 may receive a bitstream from the encoding apparatus 10, acquire feature/feature map information from the received bitstream, and send it to the decoding unit 22.

The decoding unit 22 may decode the feature/feature map based on the acquired feature/feature map information. The decoding unit 22 may perform a series of procedures such as dequantization, inverse transform, and prediction corresponding to the operation of the encoding unit 12 to increase decoding efficiency.

Depending on the embodiment, the decoding apparatus 20 may further include a task analysis/rendering unit 23.

The task analysis/rendering unit 23 may perform task analysis based on the decoded feature/feature map. Additionally, the task analysis/rendering unit 23 may render the decoded feature/feature map into a form suitable for task performance Various machine (oriented) tasks may be performed based on task analysis results and the rendered features/feature map.

As described above, the VCM system may encode/decode the feature extracted from the source image/video according to user and/or machine requests, task purpose, and surrounding environment, and performs various machine (oriented) tasks based on the decoded feature. The VCM system may be implemented by expanding/redesigning the video/image coding system and may perform various encoding/decoding methods defined in the VCM standard

VCM Pipeline

Figure 2:
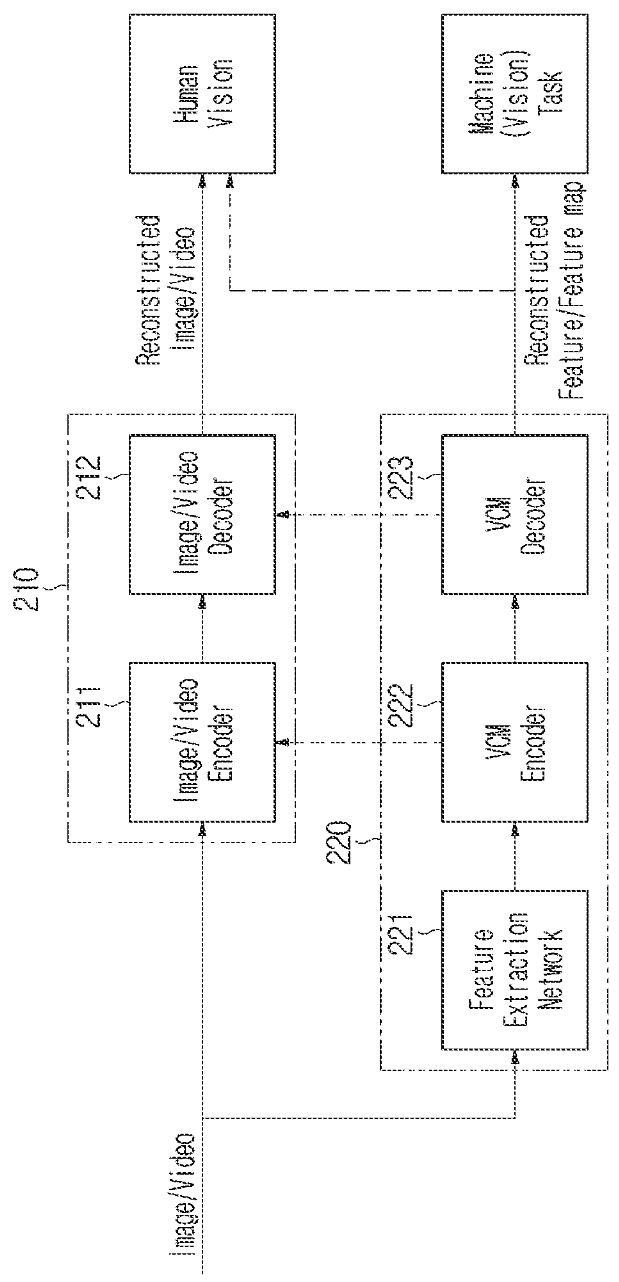
FIG. 2 is a diagram schematically showing a VCM pipeline structure to which embodiments of the present disclosure are applicable.

FIG. 2 is a diagram schematically showing a VCM pipeline structure to which embodiments of the present disclosure are applicable.

Referring to FIG. 2, the VCM pipeline 200 may include a first pipeline 210 for encoding/decoding an image/video and a second pipeline 220 for encoding/decoding a feature/feature map In the present disclosure, the first pipeline 210 may be referred to as a video codec pipeline, and the second pipeline 220 may be referred to as a feature codec pipeline.

The first pipeline 210 may include a first stage 211 for encoding an input image/video and a second stage 212 for decoding the encoded image/video to generate a reconstructed image/video. The reconstructed image/video may be used for human viewing, that is, human vision.

The second pipeline 220 may include a third stage 221 for extracting a feature/feature map from the input image/video, a fourth stage 222 for encoding the extracted feature/feature map, and a fifth stage 223 for decoding the encoded feature/feature map to generate a reconstructed feature/feature map. The reconstructed feature/feature map may be used for a machine (vision) task. Here, the machine (vision) task may refer to a task in which images/videos are consumed by a machine. The machine (vision) task may be applied to service scenarios such as, for example, Surveillance, Intelligent Transportation. Smart City, Intelligent Industry, Intelligent Content, etc. Depending on the embodiment, the reconstructed feature/feature map may be used for human vision Depending on the embodiment, the feature/feature map encoded in the fourth stage 222 may be transferred to the first stage 221 and used to encode the image/video. In this case, an additional bitstream may be generated based on the encoded feature/feature map, and the generated additional bitstream may be transferred to the second stage 222 and used to decode the image/video.

Depending on the embodiment, the feature/feature map decoded in the fifth stage 223 may be transferred to the second stage 222 and used to decode the image/video.

FIG. 2 shows a case where the VCM pipeline 200 includes a first pipeline 210 and a second pipeline 220, but this is merely an example and embodiments of the present disclosure are not limited thereto. For example, the VCM pipeline 200 may include only the second pipeline 220, or the second pipeline 220 may be expanded into multiple feature codec pipelines.

Meanwhile, in the first pipeline 210, the first stage 211 may be performed by an image/video encoder, and the second stage 212 may be performed by an image/video decoder. Additionally, in the second pipeline 220, the third stage 221 may be performed by a VCM encoder (or feature/feature map encoder), and the fourth stage 222 may be performed by a VCM decoder (or feature/feature map encoder). Hereinafter, the encoder/decoder structure will be described in detail.

Encoder

Figure 3:
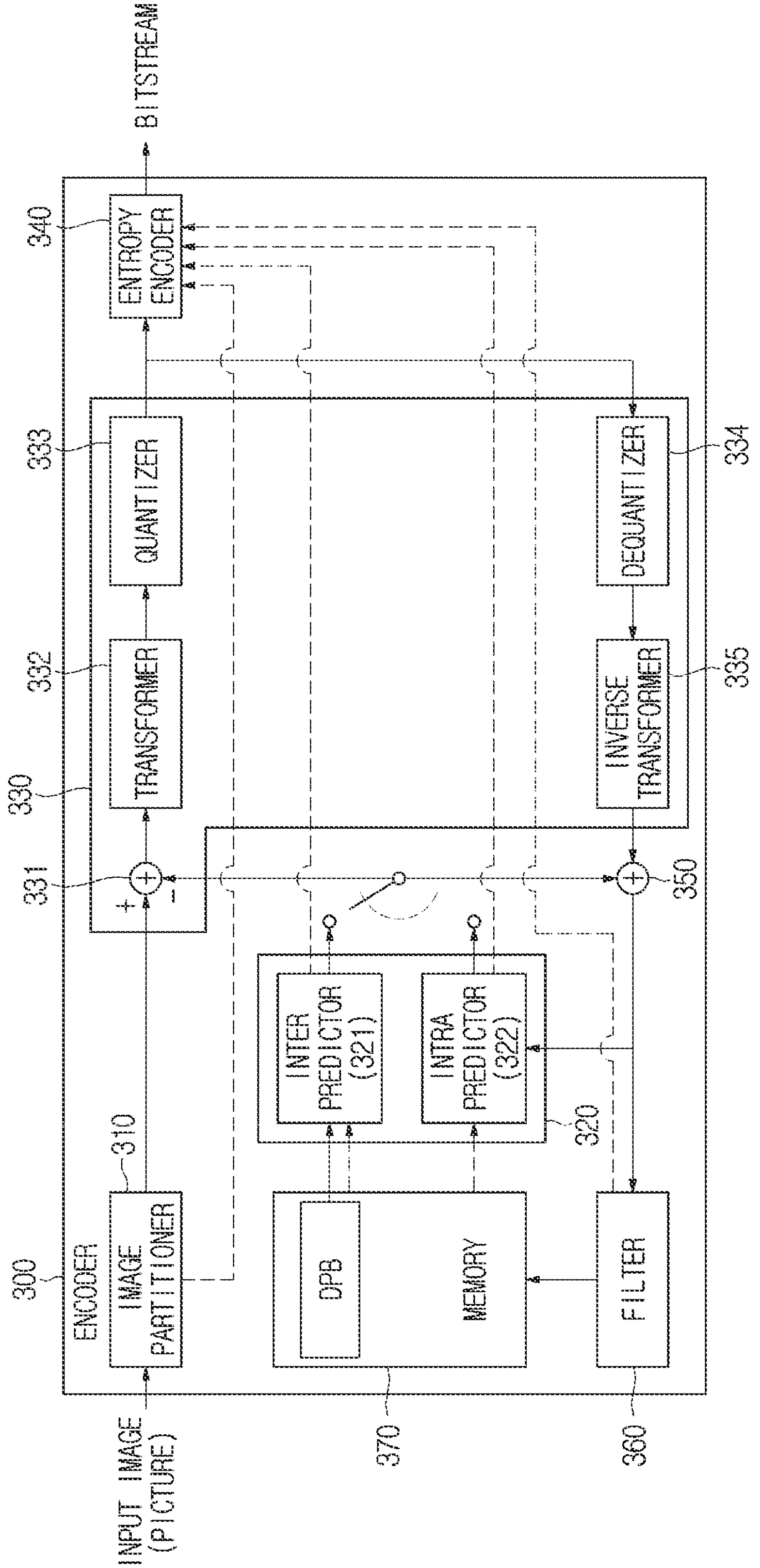
FIG. 3 is a diagram schematically showing an image/video encoder to which embodiments of the present disclosure are applicable.

FIG. 3 is a diagram schematically showing an image/video encoder to which embodiments of the present disclosure are applicable.

Referring to FIG. 3, the image/video encoder 300 may further include an image partitioner 310, a predictor 320, a residual processor 330, an entropy encoder 340, and an adder 350, a filter 360, and a memory 370. The predictor 320 may include an inter predictor 321 and an intra predictor 322, The residual processor 330 may include a transformer 332, a quantizer 333, a dequantizer 334, and an inverse transformer 335. The residual processor 330 may further include a subtractor 331. The adder 350 may be referred to as a reconstructor or a reconstructed block generator. The image partitioner 310, the predictor 320, the residual processor 330, the entropy encoder 340, the adder 350, and the filter 360 may be configured by one or more hardware components (e.g., encoder chipset or processor) depending on the embodiment. Additionally, the memory 370 may include a decoded picture buffer (DPB) and may be configured by a digital storage medium. The hardware components described above may further include a memory 370 as an internal/external component.

The image partitioner 310 may partition an input image (or picture, frame) input to the image/video encoder 300 into one or more processing units. As an example, the processing unit may be referred to as a coding unit (CU). The coding unit may be recursively partitioned according to a quad-tree binary-tree ternary-tree (QTBTTT) structure from a coding tree unit (CTU) or largest coding unit (LCU). For example, one coding unit may be partitioned into a plurality of coding units of deeper depth based on a quad tree structure, binary tree structure, and/or ternary structure. In this case, for example, the quad tree structure may be applied first and the binary tree structure and/or temary structure may be applied later. Alternatively, the binary tree structure may be applied first. The image/video coding procedure according to the present disclosure may be performed based on a final coding unit that is no longer partitioned. In this case, the largest coding unit may be used as the final coding unit based on coding efficiency according to image characteristics, or, if necessary, the coding unit may be recursively partitioned into coding units of deeper depth to use a coding unit with an optimal size as the final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may each be divided or partitioned from the final coding unit described above. The prediction unit may be a unit of sample prediction, and the transform unit may be a unit for deriving a transform coefficient and/or a unit for deriving a residual signal from the transform coefficient.

In some cases, the unit may be used interchangeably with terms such as block or area. In a general case, an M×N block may represent a set of samples or transform coefficients consisting of M columns and N rows. A sample may generally represent a pixel or a pixel value, and may represent only a pixel/pixel value of a luma component, or only a pixel/pixel value of a chroma component. The sample may be used as a term corresponding to pixel or pel.

The image/video encoder 300 may generate a residual signal (residual block, residual sample array) by subtracting a prediction signal (predicted block, prediction sample array) output from the inter predictor 321 or the intra predictor 322 from the input image signal (original block, original sample array) and transmit the generated residual signal to the transformer 332. In this case, as shown, the unit that subtracts the prediction signal (prediction block, prediction sample array) from the input image signal (original block, original sample array) within the image/video encoder 300 may be referred to as the subtractor 331. The predictor may perform prediction on a processing target block (hereinafter referred to as a current block) and generate a predicted block including prediction samples for the current block. The predictor may determine whether intra prediction or inter prediction is applied in current block or CU units. The predictor may generate various information related to prediction, such as prediction mode information, and transfer it to the entropy encoder 340. Information about prediction may be encoded in the entropy encoder 340 and output in the form of a bitstream.

The intra predictor 322 may predict the current block by referring to the samples in the current picture. At this time, the referenced samples may be located in the neighbor of the current block or may be located away from the current block, depending on the prediction mode. In intra prediction, the prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on settings. The intra predictor 322 may determine the prediction mode applied to the current block by using a prediction mode applied to a neighboring block.

The inter predictor 321 may derive a predicted block for the current block based on a reference block (reference sample array) specified by a motion vector on a reference picture. In this case, in order to reduce the amount of motion information transmitted in the inter prediction mode, the motion information may be predicted in block, subblock, or sample units based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 321 may construct a motion information candidate list based on neighboring blocks and generate information indicating which candidate is used to derive a motion vector and/or reference picture index of the current block. Inter prediction may be performed based on various prediction modes, and, for example, in the case of a skip mode and a merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and a motion vector difference may be signaled to indicate the motion vector of the current block.

The predictor 320 may generate a prediction signal based on various prediction methods. For example, the predictor may not only apply intra prediction or inter prediction but also simultaneously apply both intra prediction and inter prediction, for prediction of one block. This may be called combined inter and intra prediction (CIIP). In addition, the predictor may be based on an intra block copy (IBC) prediction mode or a palette mode for prediction of the block. The IBC prediction mode or the palette mode may be used for content image/video coding of a game or the like, for example, screen content coding (SCC). IBC basically performs prediction within the current picture, but may be performed similarly to inter prediction in that a reference block is derived within the current picture. That is, IBC may use at least one of the inter prediction techniques described in the present disclosure. The palette mode may be regarded as an example of intra coding or intra prediction. When the palette mode is applied, the sample values within the picture may be signaled based on information about a palette table and a palette index.

The prediction signal generated by the predictor 320 may be used to generate a reconstructed signal or to generate a residual signal. The transformer 332 may generate transform coefficients by applying a transform technique to the residual signal. For example, the transform technique may include at least one of a discrete cosine transform (DCT), a discrete sine transform (DST), a karhunen-loève transform (KLT). a graph-based transform (GBT), or a conditionally non-linear transform (CNT). Here, the GBT refers to transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to non-square blocks having a variable size.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may reorder quantized transform coefficients in a block form into a one-dimensional vector form based on a coefficient scan order and generate information on the quantized transform coefficients based on the quantized transform coefficients in the one-dimensional vector form. The entropy encoder 340 may perform various encoding methods such as, for example, exponential Golomb, context-adaptive variable length coding (CAVLC), context-adaptive binary arithmetic coding (CABAC), and the like. The entropy encoder 340 may encode information necessary for video/image reconstruction other than quantized transform coefficients (e.g., values of syntax elements, etc.) together or separately: Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In addition, the video/image information may further include a method of generating and using encoded information, a purpose, and the like. In the present disclosure, information and/or syntax elements transferred/signaled from the image/video encoder to the image/video decoder may be included in image/video information. The image/video information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB. SD, CD, DVD, Blu-ray, HDD. SSD, and the like. A transmitter (not shown) transmitting a signal output from the entropy encoder 340 and/or a storage unit (not shown) storing the signal may be configured as internal/external element of the image/video encoder 300, or the transmitter may be included in the entropy encoder 340.

The quantized transform coefficients output from the quantizer 130 may be used to generate a prediction signal. For example, the residual signal (residual block or residual samples) may be reconstructed by applying dequantization and inverse transform to the quantized transform coefficients through the dequantizer 334 and the inverse transformer 335. The adder 350 adds the reconstructed residual signal to the prediction signal output from the inter predictor 321 or the intra predictor 322 to generate a reconstructed signal (reconstructed picture, reconstructed block, reconstructed sample array). In a case where there is no residual for the processing target block, such as a case where the skip mode is applied, the predicted block may be used as the reconstructed block. The adder 350 may be called a reconstructor or a reconstructed block generator. The generated reconstructed signal may be used for intra prediction of a next processing target block in the current picture and may be used for inter prediction of a next picture through filtering as described below.

Meanwhile, luma mapping with chroma scaling (LMCS) is applicable in a picture encoding and/or reconstruction process.

The filter 360 may improve subjective/objective image quality by applying filtering to the reconstructed signal For example, the filter 360 may generate a modified reconstructed picture by applying various filtering methods to the reconstructed picture, and store the modified reconstructed picture in the memory 370, specifically, a DPB of the memory 370. The various filtering methods may include, for example, deblocking filtering, a sample adaptive offset, an adaptive loop filter, a bilateral filter, and the like. The filter 360 may generate various information related to filtering and transmit the generated information to the entropy encoder 190. The information related to filtering may be encoded by the entropy encoder 340 and output in the form of a bitstream.

The modified reconstructed picture transmitted to the memory 370 may be used as the reference picture in the inter predictor 321. Through this. prediction mismatch between the encoder and the decoder may be avoided and encoding efficiency may be improved.

The DPB of the memory 370 may store the modified reconstructed picture for use as a reference picture in the inter predictor 321. The memory 370 may store the motion information of the block from which the motion information in the current picture is derived (or encoded) and/or the motion information of the blocks in the already reconstructed picture. The stored motion information may be transferred to the inter predictor 321 for use as the motion information of the spatial neighboring block or the motion information of the temporal neighboring block. The memory 370 may store reconstructed samples of reconstructed blocks in the current picture and may transfer the stored reconstructed samples to the intra predictor 322.

Meanwhile, the VCM encoder (or feature/feature map encoder) basically performs a series of procedures such as prediction, transform, and quantization to encode the feature/feature map and thus may basically have the same/similar structure as the image/video encoder 300 described with reference to FIG. 3. However, the VCM encoder is different from the image/video encoder 300 in that the feature/feature map is an encoding target, and thus may be different from the image/video encoder 300 in the name of each unit (or component) (e.g., image partitioner 310, etc.) and its specific operation content. The specific operation of the VCM encoder will be described in detail later.

Decoder

Figure 4:
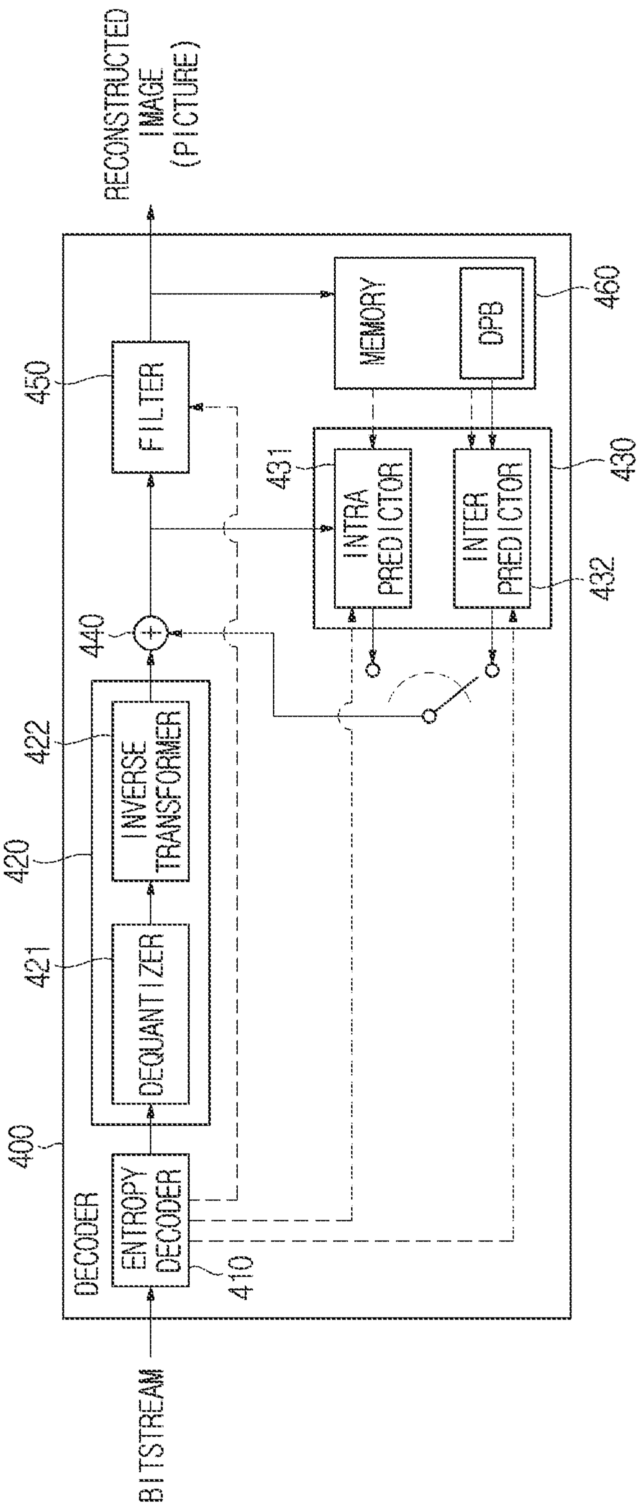
FIG. 4 is a diagram schematically showing an image/video decoder to which embodiments of the present disclosure are applicable.

FIG. 4 is a diagram schematically showing an image/video decoder to which embodiments of the present disclosure are applicable.

Referring to FIG. 4, the image/video decoder 400 may include an entropy decoder 410, a residual processor 420, a predictor 430, an adder 440, a filter 450 and a memory 460. The predictor 430 may include an inter predictor 431 and an intra predictor 432. The residual processor 420 may include a dequantizer 421 and an inverse transformer 422. The entropy decoder 410, the residual processor 420, the predictor 430, the adder 440, and the filter 450 may be configured by one hardware component (e.g., a decoder chipset or processor) depending on the embodiment. Additionally, the memory 460 may include a decoded picture buffer (DPB) and may be configured by a digital storage medium. The hardware component may further include the memory 460 as an internal/external component.

When a bitstream containing video/image information is input, the image/video decoder 400 may reconstruct an image/video in correspondence with the process in which the image/video information is processed in the image/video encoder 300 of FIG. 3. For example. the image/video decoder 400 may derive units/blocks based on block partition-related information acquired from the bitstream. The image/video decoder 400 may perform decoding using a processing unit applied in the image/video encoder. Accordingly, the processing unit of decoding may, for example, be a coding unit, and the coding unit may be partitioned from a coding tree unit or a largest coding unit according to a quad tree structure, a binary tree structure and/or a ternary tree structure. One or more transform units may be derived from the coding unit. In addition, the reconstructed image signal decoded and output through the image/video decoder 400 may be played through a playback device.

The image/video decoder 400 may receive a signal output from the encoder of FIG. 3 in the form of a bitstream, and decode the received signal through the entropy decoder 410. For example, the entropy decoder 410 may parse the bitstream to derive information (e.g., image/video information) necessary for image reconstruction (or picture reconstruction). The image/video information may further include information about various parameter sets, such as an adaptation parameter set (APS), picture parameter set (PPS), sequence parameter set (SPS), or video parameter set (VPS). Additionally, image/video information may further include general constraint information. Additionally, the image/video information may include a method of generating and using decoded information, a purpose, and the like. The image/video decoder 400 may decode the picture further based on information about the parameter set and/or general constraint information. The signaled/received information and/or syntax elements may be decoded and acquired from the bitstream through a decoding procedure. For example, the entropy decoder 410 may decode information in the bitstream based on a coding method such as exponential Golomb coding, CAVLC, or CABAC, and output the values of syntax elements necessary for image reconstruction and quantized values of transform coefficients related to residuals. More specifically, in the CABAC entropy decoding method, a bin corresponding to each syntax element may be received in the bitstream, a context model may be determined using decoding target syntax element information and decoding information of neighboring and decoding target blocks or information on the symbol/bin decoded in the previous step, the occurrence probability of the bin may be predicted according to the determined context model, and arithmetic decoding of the bin may be performed to generate a symbol corresponding to the value of each syntax element. At this time, the CABAC entropy decoding method may update the context model using the information on the decoded symbol/bin for the context model of the next symbol/bin after determining the context model. Information about prediction among the information decoded in the entropy decoder 410 is provided to the predictor (inter predictor 432 and intra predictor 431), and a residual value obtained by performing entropy decoding in the entropy decoder 410, that is, quantized transform coefficients and related parameter information may be input to the residual processor 420. The residual processor 420 may derive a residual signal (residual block, residual samples. residual sample array). Additionally, information about filtering among the information decoded by the entropy decoder 410 may be provided to the filter 450. Meanwhile, a receiver (not shown) that receives a signal output from the image/video encoder may be further configured as an internal/external element of the image/video decoder 400, or the receiver may be a component of the entropy decoder 410. Meanwhile, the image/video decoder according to the present disclosure may be called an image/video decoding apparatus, and the image/video decoder may be divided into an information decoder (image/video information decoder) and a sample decoder (image/video sample decoder). In this case, the information decoder may include an entropy decoder 410, and the sample decoder may include at least one of a dequantizer 321, an inverse transformer 322, an adder 440, a filter 450, and a memory 460, an inter predictor 432 or an intra predictor 431.

The dequantizer 421 may dequantize the quantized transform coefficients and output transform coefficients. The dequantizer 421 may rearrange the quantized transform coefficients into a two-dimensional block form. In this case, rearranging may be performed based on the coefficient scan order performed in the image/video encoder. The dequantizer 321 may perform dequantization on quantized transform coefficients using quantization parameters (e.g., quantization step size information) and acquire transform coefficients.

The inverse transformer 422 inversely transforms the transform coefficients to acquire a residual signal (residual block, residual sample array).

The predictor 430 may perform prediction on the current block and generate a predicted block including prediction samples for the current block. The predictor may determine whether intra prediction or inter prediction is applied to the current block based on information about prediction output from the entropy decoder 410, and may determine a specific intra/inter prediction mode The predictor 420 may generate a prediction signal based on various prediction methods. For example, the predictor may not only apply intra prediction or inter prediction for prediction of one block, but also may apply intra prediction and inter prediction simultaneously. This may be called combined inter and intra prediction (CHIP). Additionally, the predictor may be based on an intra block copy (IBC) prediction mode or a palette mode for prediction of a block. The IBC prediction mode or palette mode may be used, for example, for image/video coding of content such as games, such as screen content coding (SCC). In IBC, prediction is basically performed within the current picture, but may be performed similarly to inter prediction in that a reference block is derived within the current picture. That is, IBC may use at least one of the inter prediction techniques described in this document. The palette mode may be viewed as an example of intra coding or intra prediction. When the palette mode is applied, information about the palette table and palette index may be included and signaled in the image/video information.

The intra predictor 431 may predict the current block by referencing samples in the current picture. The referenced samples may be located in the neighbor of the current block, or may be located away from the current block, depending on the prediction mode. In intra prediction, prediction modes may include a plurality of non-directional modes and a plurality of directional modes. The intra predictor 431 may determine the prediction mode applied to the current block using the prediction mode applied to the neighboring block.

The inter predictor 432 may derive a predicted block for the current block based on a reference block (reference sample array) specified by a motion vector in the reference picture. At this time, in order to reduce the amount of motion information transmitted in the inter prediction mode, motion information may be predicted in block, subblock, or sample units based on the correlation of motion information between the neighboring block and the current block. The motion information may include a motion vector and a reference picture index. The motion information may further include inter prediction direction (L0 prediction, L1 prediction. Bi prediction, etc.) information. In the case of inter prediction, neighboring blocks may include a spatial neighboring block present in the current picture and a temporal neighboring block present in the reference picture. For example, the inter predictor 432 may construct a motion information candidate list based on neighboring blocks and derive a motion vector and/or reference picture index of the current block based on received candidate selection information. Inter prediction may be performed based on various prediction modes, and information about prediction may include information indicating the mode of inter prediction for the current block.

The adder 440 may generate a reconstructed signal (reconstructed picture, reconstructed block, reconstructed sample array) by adding the acquired residual signal to a prediction signal (predicted block, prediction sample array) output from the predictor (including the inter predictor 432 and/or the intra predictor 431). If there is no residual for a processing target block, such as when skip mode is applied, the predicted block may be used as a reconstruction block.

The adder 440 may be called a reconstructor or a reconstruction block generator. The generated reconstructed signal may be used for intra prediction of a next processing target block in the current picture, may be output after filtering as described later, or may be used for inter prediction of a next picture.

Meanwhile, luma mapping with chroma scaling (LMCS) is applicable in a picture decoding process.

The filter 450 can improve subjective/objective image quality by applying filtering to the reconstructed signal. For example, the filter 450 may generate a modified reconstructed picture by applying various filtering methods to the reconstructed picture, and transmit the modified reconstructed picture in the memory 460, specifically the DPB of the memory 460. Various filtering methods may include, for example, deblocking filtering, sample adaptive offset, adaptive loop filter, bilateral filter, etc.

The (modified) reconstructed picture stored in the DPB of the memory 460 may be used as a reference picture in the inter predictor 432. The memory 460 may store motion information of a block from which motion information in the current picture is derived (or decoded) and/or motion information of blocks in an already reconstructed picture. The stored motion information may be transferred to the inter predictor 432 for use as motion information of spatial neighboring blocks or motion information of temporal neighboring blocks. The memory 460 may store reconstructed samples of reconstructed blocks in the current picture and transfer them to the intra predictor 431.

Meanwhile, the VCM decoder (or feature/feature map decoder) performs a series of procedures such as prediction, inverse transform, and dequantization to decode the feature/feature map, and may basically have the same/similar structure as the image/video decoder 400 described above with reference to FIG. 4. However, the VCM decoder is different from the image/video decoder 400 in that the feature/feature map is a decoding target, and may be different from the image/video decoder 400 in the name (e.g., DPB, etc.) of each unit (or component) and its specific operation. The operation of the VCM decoder may correspond to the operation of the VCM encoder, and the specific operation will be described in detail later.

Feature/Feature Map Encoding Procedure

Figure 5:
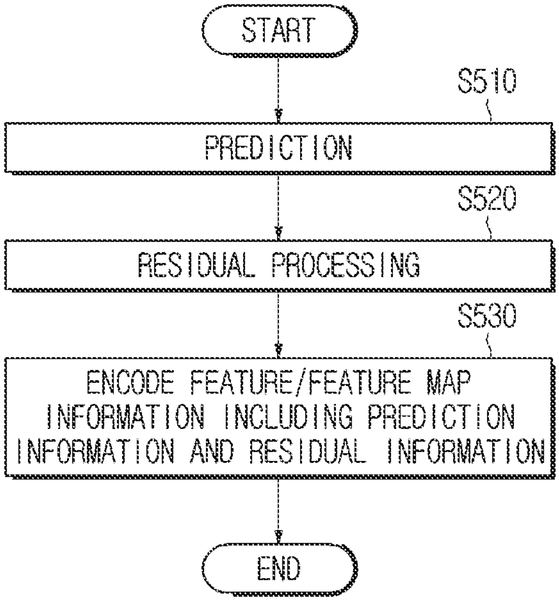
FIG. 5 is a flowchart schematically illustrating a feature/feature map encoding procedure to which embodiments of the present disclosure are applicable.

FIG. 5 is a flowchart schematically illustrating a feature/feature map encoding procedure to which embodiments of the present disclosure are applicable.

Referring to FIG. 5, the feature/feature map encoding procedure may include a prediction procedure (S510), a residual processing procedure (S520), and an information encoding procedure (S530).

The prediction procedure (S510) may be performed by the predictor 320 described above with reference to FIG. 3.

Specifically, the intra predictor 322 may predict a current block (that is, a set of current encoding target feature elements) by referencing feature elements in a current feature/feature map. Intra prediction may be performed based on the spatial similarity of feature elements constituting the feature/feature map. For example, feature elements included in the same region of interest (RoI) within an image/video may be estimated to have similar data distribution characteristics. Accordingly, the intra predictor 322 may predict the current block by referencing the already reconstructed feature elements within the region of interest including the current block. At this time, the referenced feature elements may be located adjacent to the current block or may be located away from the current block depending on the prediction mode. Intra prediction modes for feature/feature map encoding may include a plurality of non-directional prediction modes and a plurality of directional prediction modes. The non-directional prediction modes may include, for example, prediction modes corresponding to the DC mode and planar mode of the image/video encoding procedure. Additionally, the directional modes may include prediction modes corresponding to, for example, 33 directional modes or 65 directional modes of an image/video encoding procedure. However, this is an example, and the type and number of intra prediction modes may be set/changed in various ways depending on the embodiment The inter predictor 321 may predict the current block based on a reference block (i.e., a set of referenced feature elements) specified by motion information on the reference feature/feature map. Inter prediction may be performed based on the temporal similarity of feature elements constituting the feature/feature map. For example, temporally consecutive features may have similar data distribution characteristics. Accordingly, the inter predictor 321 may predict the current block by referencing the already reconstructed feature elements of features temporally adjacent to the current feature. At this time, motion information for specifying the referenced feature elements may include a motion vector and a reference feature/feature map index. The motion information may further include information about an inter prediction direction (e.g., L0 prediction, L1 prediction, Bi prediction, etc.). In the case of inter prediction, neighboring blocks may include spatial neighboring blocks present within the current feature/feature map and temporal neighboring blocks present within the reference feature/feature map. A reference feature/feature map including a reference block and a reference feature/feature map including a temporal neighboring block may be the same or different. The temporal neighboring block may be referred to as a collocated reference block, etc., and a reference feature/feature map including a temporal neighboring block may be referred to as a collocated feature/feature map. The inter predictor 321 may construct a motion information candidate list based on neighboring blocks and generate information indicating which candidate is used to derive the motion vector and/or reference feature/feature map index of the current block. Inter prediction may be performed based on various prediction modes. For example, in the case of the skip mode and the merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block is used as a motion vector predictor, and the motion vector of the current block may be indicated by signaling the motion vector difference. The predictor 320 may generate a prediction signal based on various prediction methods in addition to intra prediction and inter prediction described above.

The prediction signal generated by the predictor 320 may be used to generate a residual signal (residual block, residual feature elements) (S520). The residual processing procedure (S520) may be performed by the residual processor 330 described above with reference to FIG. 3. In addition, (quantized) transform coefficients may be generated through a transform and/or quantization procedure for the residual signal, and the entropy encoder 340 may encode information about the (quantized) transform coefficients in the bitstream as residual information (S530). Additionally, the entropy encoder 340 may encode information necessary for feature/feature map reconstruction, such as prediction information (e.g., prediction mode information, motion information, etc), in the bitstream, in addition to the residual information.

Meanwhile, the feature/feature map encoding procedure may further include not only a procedure (S530) for encoding information for feature/feature map reconstruction (e.g., prediction information, residual information, partitioning information, etc.) and outputting it in the form of a bitstream, a procedure for generating a reconstructed feature/feature map for the current feature/feature map and a procedure (optional) for applying in-loop filtering to the reconstructed feature/feature map.

The VCM encoder may derive (modified) residual feature(s) from the quantized transform coefficient(s) through dequantization and inverse transform, and generate a reconstructed feature/feature map based on the predicted feature(s) and (modified) residual feature(s) that are the output of step S510. The reconstructed feature/feature map generated in this way may be the same as the reconstructed feature/feature map generated in the VCM decoder. When an in-loop filtering procedure is performed on the reconstructed feature/feature map, a modified reconstructed feature/feature map may be generated through the in-loop filtering procedure on the reconstructed feature/feature map. The modified reconstructed feature/feature map may be stored in a decoded feature buffer (DFB) or memory and used as a reference feature/feature map in the feature/feature map prediction procedure later. Additionally, (in-loop) filtering-related information (parameters) may be encoded and output in the form of a bitstream. Through the in-loop filtering procedure, noise that may occur during feature/feature map coding may be removed, and feature/feature map-based task performance may be improved. In addition, by performing an in-loop filtering procedure at both the encoder stage and the decoder stage, the identity of the prediction result can be guaranteed, the reliability of feature/feature map coding can be improved, and the amount of data transmission for feature/feature map coding can be reduced.

Feature/Feature Map Decoding Procedure

Figure 6:
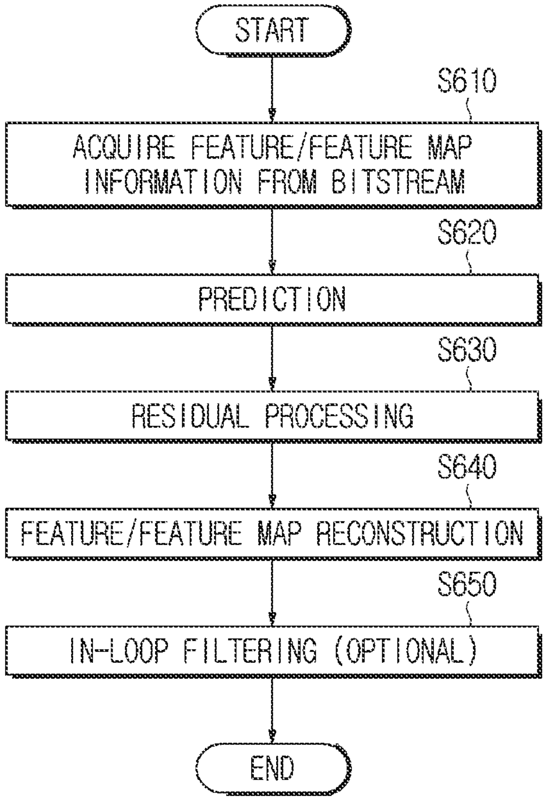
FIG. 6 is a flowchart schematically illustrating a feature/feature map decoding procedure to which embodiments of the present disclosure are applicable.

FIG. 6 is a flowchart schematically illustrating a feature/feature map decoding procedure to which embodiments of the present disclosure are applicable.

Referring to FIG. 6, the feature/feature map decoding procedure may include an image/video information acquisition procedure (S610), a feature/feature map reconstruction procedure (S620 to S640), and an in-loop filtering procedure for a reconstructed feature/feature map (S650). The feature/feature map reconstruction procedure may be performed on the prediction signal and residual signal acquired through inter/intra prediction (S620) and residual processing (S630), dequantization and inverse transform process for quantized transform coefficients described in the present disclosure. A modified reconstructed feature/feature map may be generated through an in-loop filtering procedure for the reconstructed feature/feature map, and the modified reconstructed feature/feature map may be output as a decoded feature/feature map. The decoded feature/feature map may be stored in a decoded feature buffer (DFB) or memory and used as a reference feature/feature map in the inter prediction procedure when decoding the feature/feature map. In some cases, the above-described in-loop filtering procedure may be omitted. In this case, the reconstructed feature/feature map may be output without change as a decoded feature/feature map, and stored in the decoded feature buffer (DFB) or memory, and then be used as a reference feature/feature map in the inter prediction procedure when decoding the feature/feature map.

Feature Extraction Method and Data Distribution Characteristics

Figure 7:
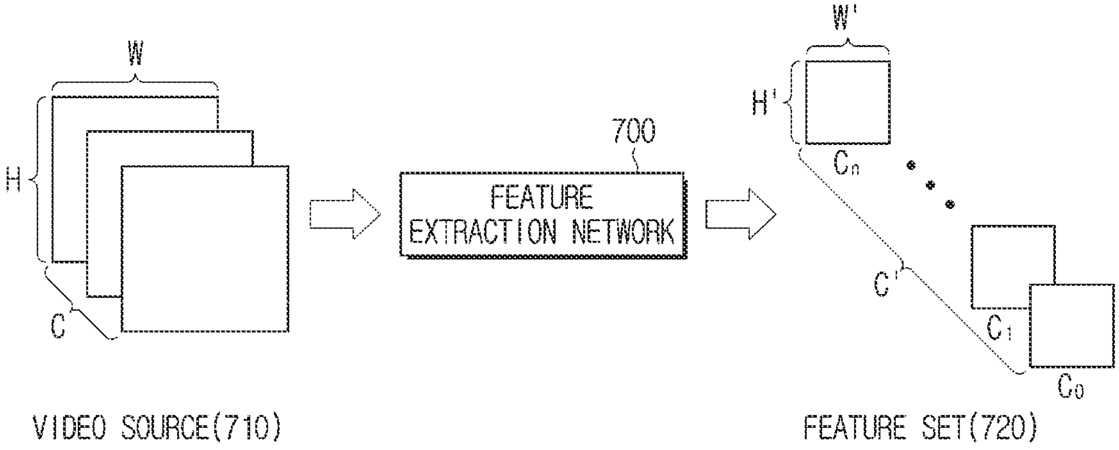
FIG. 7 is a diagram illustrating an example of a feature extraction method using a feature extraction network.

FIG. 7 is a diagram illustrating an example of a feature extraction method using a feature extraction network.

Referring to FIG. 7, the feature extraction network 700 may receive a video source 710 and perform a feature extraction operation to output a feature set 720 of the video source 710. The feature set 720 may include a plurality of features $C_0, C_1, \ldots C_n$ extracted from the video source 710, and may be expressed as a feature map. Each feature $C_0, C_1, \ldots C_n$ includes a plurality of feature elements and may have different data distribution characteristics.

In FIG. 7, W, H, and C may mean the width, height, and number of channels of the video source 710, respectively. Here, the number C of channels of the video source 710 may be determined based on the image format of the video source 710. For example, when the video source 710 has an RGB image format, the number C of channels of the video source 710 may be 3.

Additionally, W', H', and C' may mean the width, height, and number of channels of the feature set 720, respectively. The number C' of channels of the feature set 720 may be equal to the total number (n+1) of features $C_0, C_1, \ldots C_n$ extracted from the video source 710. In one example, the number C' of channels of the feature set 720 may be greater than the number C of channels of the video source 710.

The properties W', H', C' of the feature set 720 may vary depending on the properties W, H, C of the video source 710. For example, as the number C of channels of the video source 710 increases, the number C' of channels of the feature set 720 may also increase. Additionally, the properties W', H', C' of the feature set 720 may vary depending on the type and properties of the feature extraction network 700. For example, if the feature extraction network 700 is implemented as an artificial neural network (e.g., CNN, DNN, etc.), the properties W', H', C' of the feature set 720 may also vary according to the location of the layer outputting each feature $C_0, C_1, \ldots C_n$.

The video source 710 and the feature set 720 may have different data distribution characteristics. For example, the video source 710 may generally consist of one (grayscale image) channel or three (RGB image) channels. Pixels included in the video source 710 may have the same integer value range for all channels and may have non-negative values. Additionally, each pixel value may be evenly distributed within a predetermined integer value range. On the other hand, the feature set 720 may be composed of a various number of channels (e.g., 32, 64, 128. 256, 512, etc.) depending on the type of feature extraction network 700 (e.g., CNN. DNN, etc.) and layer location. Feature elements included in the feature set 720 may have different real value ranges for each channel and may also have negative values. Additionally, each feature element value may be intensively distributed in a specific area within a predetermined real value range.

Figure 8A:
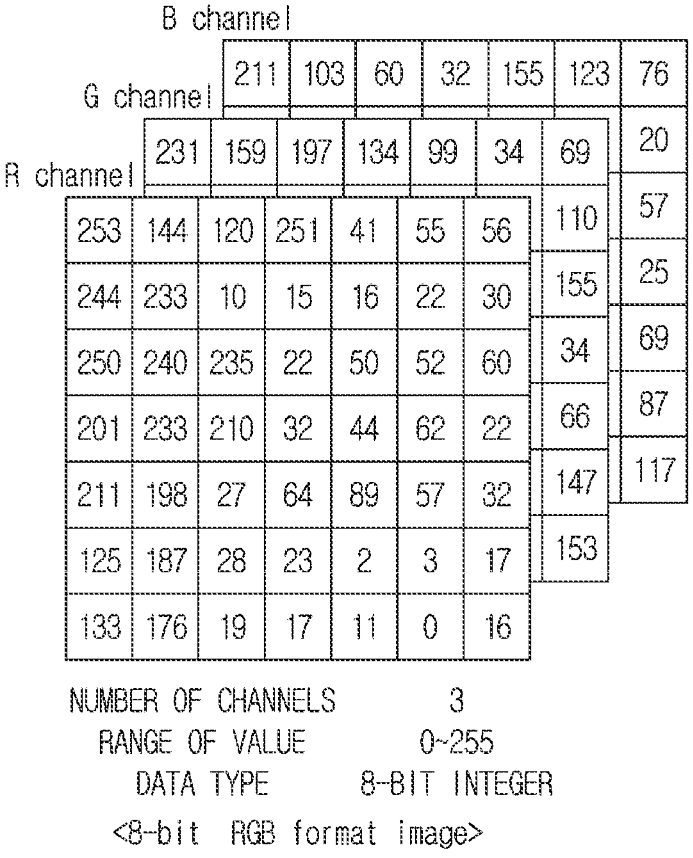
FIG. 8*a* is a diagram showing data distribution characteristics of a video source.
Figure 8B:
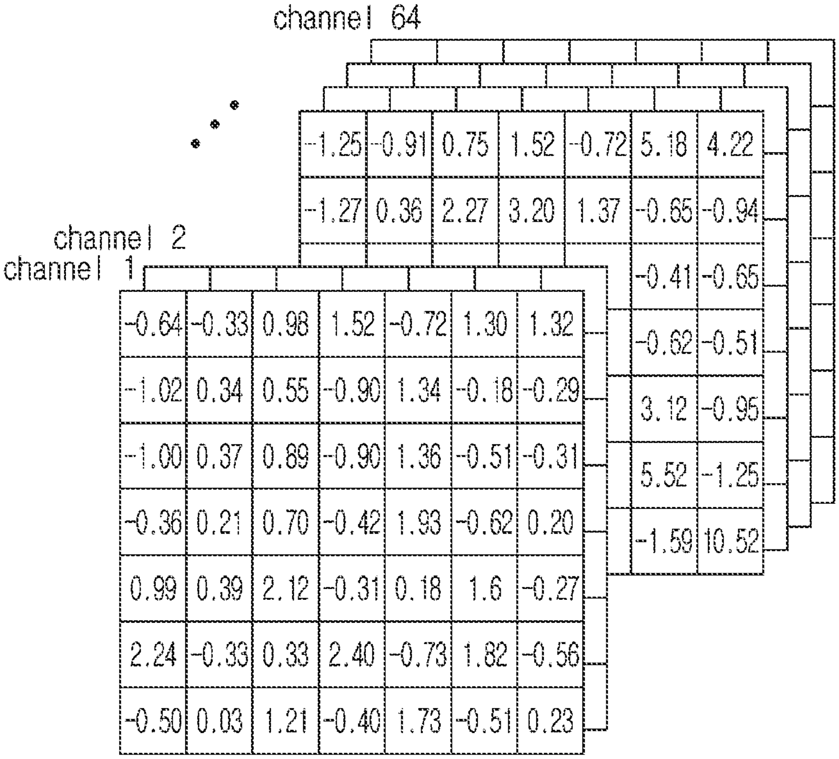
FIG. 8*b* is a diagram showing data distribution characteristics of a feature set.

FIG. 8*a* is a diagram showing the data distribution characteristics of a video source, and FIG. 8*b* is a diagram showing the data distribution characteristics of a feature set.

First, referring to FIG. 8*a*, the video source consists of a total of three channels, R, G, and B, and each pixel value may have an integer value range from 0 to 255. In this case, the data type of the video source may be expressed as an 8-bit integer type.

In contrast, referring to FIG. 8*b*, the feature set consists of 64 channels (features), and each feature element value may have a real value range from −∞ to +∞. In this case, the data type of the feature set may be expressed as a 32-bit floating point type.

A feature set may have feature element values of floating point type, and may have different data distribution characteristics for each channel (or feature). An example of data distribution characteristics for each channel of the feature set is shown in Table 1.

TABLE 1

| Channel | Average(μ) | Standard derivation(σ) | Max | Min |
|---|---|---|---|---|
| $C_0$ | 10 | 20 | 90 | 60 |
| $C_1$ | 30 | 10 | 70.5 | −70.2 |
| | | . | | |
| | | . | | |
| | | . | | |
| $C_n$ | 100 | 5 | 115.8 | 80.2 |

Referring to Table 1, the feature set may consist of a total of n+1 channels $C_0$, $C_1$, . . . $C_n$The average value μ, standard deviation σ, maximum value Max, and minimum value Min of the feature elements may be different for each channel $C_0$, $C_1$, . . . $C_n$. For example, the average value μ of the feature elements included in channel 0 $C_0$ may be 10, the standard deviation σ may be 20, the maximum value Max may be 90, and the minimum value Min may be 60. Additionally, the average value μ of the feature elements included in channel 1 $C_1$ may be 30, the standard deviation σ may be 10, the maximum value Max may be 70.5, and the minimum value Min may be −70.2. Additionally, the average value μ of the feature elements included in the n-th channel $C_n$ may be 100, the standard deviation σ may be 5, the maximum value Max may be 115.8, and the minimum value Min may be 80.2.

Quantization of the feature/feature map may be performed, for example, based on different data distribution characteristics for each channel described above. Feature/feature map data of floating point type may be transformed into integer type through quantization.

Meanwhile, due to spatiotemporal similarity between consecutive frames, feature sets and/or channels consecutively extracted from a video source may have the same/similar data distribution characteristics. An example of the data distribution characteristics of consecutive feature sets is shown in Table 2.

TABLE 2

| Feature set | Average(μ) | Standard derivation(σ) | Max | Min |
|---|---|---|---|---|
| $f_{F0}$ | 50 | 10 | 110.5 | 10.7 |
| $f_{F1}$ | 52 | 11 | 120.5 | 11.5 |
| $f_{F2}$ | 53 | 10 | 115 | 5 |

In Table 2, $f_{F0}$ means a first feature set extracted from Frame 0) (F0), $f_{F1}$ means a second feature set extracted from frame 1 (F1), and $f_{F2}$ means a third feature set extracted from Frame 2 (F2).

Referring to Table 2, the consecutive first to third feature sets $f_{F0}$, $f_{F1}$ and $f_{F2}$ have the same/similar average value μ, standard deviation σ, maximum value Max and minimum value Min.

Also, due to the spatiotemporal similarity between consecutive frames, corresponding channels in feature sets consecutively extracted from a video source may have the same/similar data distribution characteristics. An example of the data distribution characteristics of corresponding channels of the consecutive feature sets is as shown in Table 3.

TABLE 3

| Feature set | Average(μ) | Standard derivation(σ) | Max | Min |
|---|---|---|---|---|
| $f_{F0C0}$ | 40 | 10 | 110.5 | 10.7 |
| $f_{F1C0}$ | 40 | 11 | 111.5 | 11.5 |

In Table 3, froco means a first channel in a first feature set extracted from Frame 0 (F0), and $f_{F1C0}$ means a first channel in a second feature set extracted from Frame 1 (F1).

Referring to Table 3, the first channel froco in the first feature set and the second channel $f_{F1C0}$ in the second feature set corresponding thereto have the same/similar average value μ, standard deviation σ, maximum value Max, and minimum value Min.

Prediction of the feature/feature map may be performed, for example, based on the similarity of data distribution characteristics between the above-described feature sets or channels.

Figure 9A:
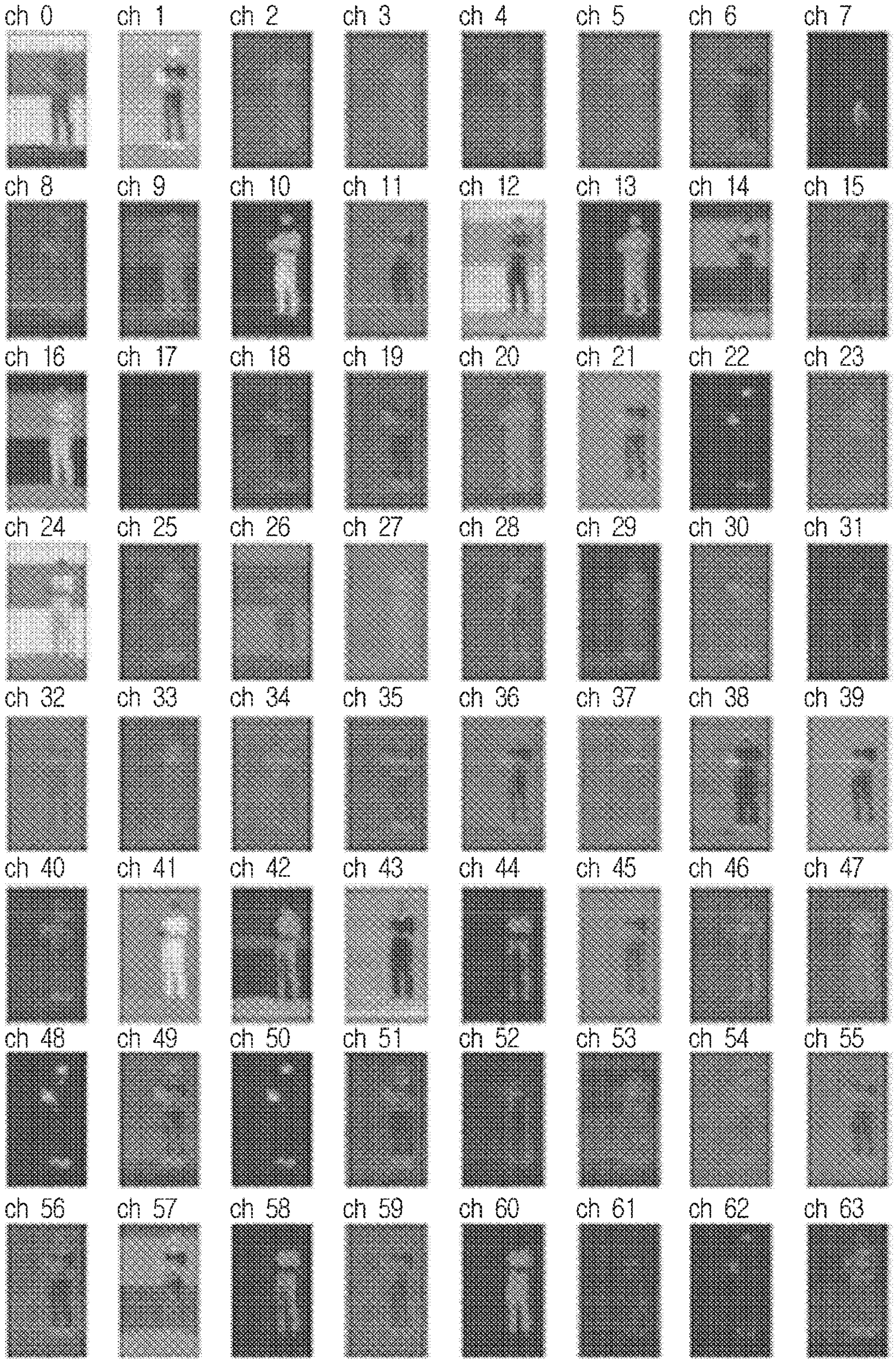
FIG. 9*a* is a diagram showing an example of a feature map composed of 64 channels.
Figure 9B:
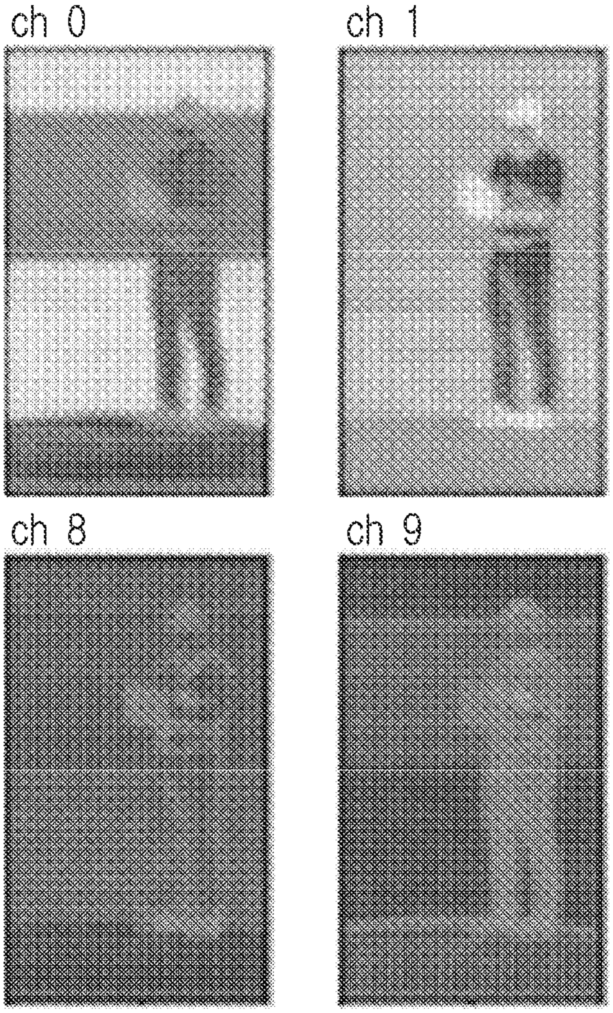
FIG. 9*b* is an enlarged diagram showing four adjacent channels among the channels of FIG. 9*a*.

FIG. 9*a* is a diagram showing an example of a feature map composed of 64 channels, and FIG. 9*b* is an enlarged diagram showing four adjacent channels among the channels of FIG. 9*a*.

Referring to FIGS. 9*a* and 9*b*, it can be seen that the feature information of channel 24 is visually similar to channel 0 rather than channel 1 and channel 8, which are adjacent to channel 0. Additionally, it can be seen that feature information is not visually continuous at the boundary between channel 0 and channel 1, and at the boundary between channel 0) and channel 8.

Figure 10:
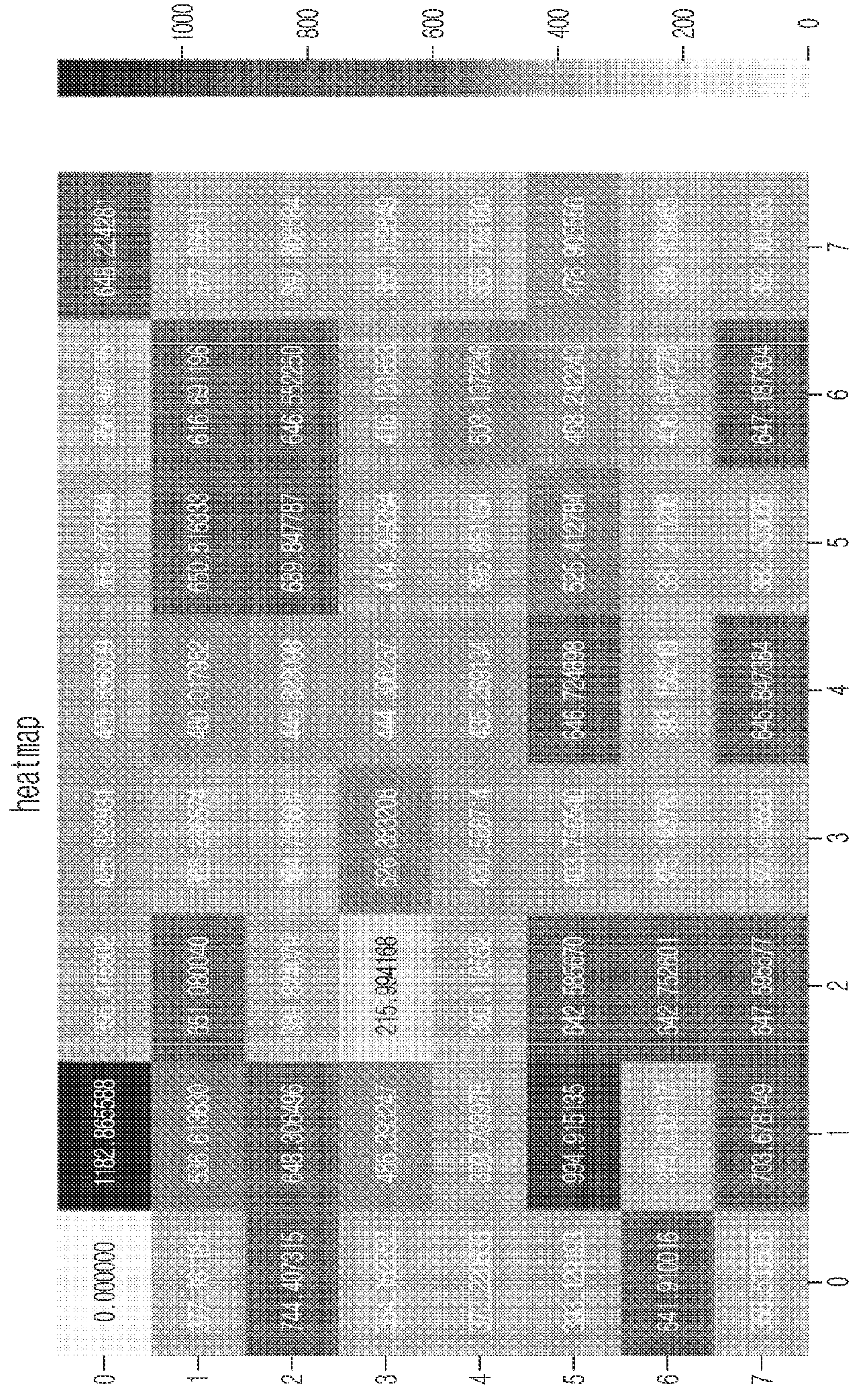
FIG. 10 is a diagram for explaining a result of calculating an Euclidean distance between channels.

In order to check the similarity between channels of feature information, the results of calculating the Euclidean distance between channel 0 and each channel are shown in FIG. 10. Referring to FIG. 10, it can be seen that the Euclidean distance between channel 0 and the nearest channel 2 is approximately 1182, which is the largest among the 64 channels. Since the larger the Euclidean distance, the lower the similarity, channel 2 may have feature information that is the most dissimilar to channel 0. On the other hand, it can be seen that the Euclidean distance between channel 0 and relatively spaced channel 26 is about 215, which is the smallest among the 64 channels. Since the smaller the Euclidean distance, the higher the similarity. channel 26 may have the most similar feature information to channel 0.

As can be seen in the examples of FIGS. 9*a* to 10, unlike images/videos that generally have high similarity between adjacent samples, the feature map have the characteristic that similarity and spatial distance between channels is not linear. In other words, the similarity between channels of the feature map may be determined regardless of the spatial distance. Additionally, since each channel of the feature map includes feature information for one image (or picture), discontinuity in feature information (or feature values) may occur at channel boundaries. Therefore, when predicting a feature/feature map by referencing adjacent channel information within the original feature map, a problem may occur where prediction efficiency and accuracy are degraded.

As the number of reference information increases, since the size of the memory for storing the reference information and the amount of computation for reference information search may rapidly increase, it is inevitable to limit the number of reference information. However, when the features/feature map is encoded in the original channel number (e.g., channel 0→channel 1→channel 2), reference information also has to be used in the encoding order and thus the difference value with referenced similar channels increases. As a result, coding efficiency may decrease.

Figure 11:
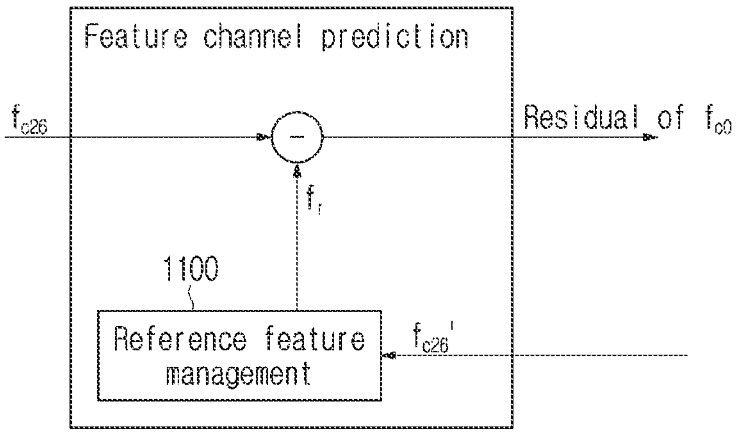
FIG. 11 is a diagram for explaining a reference feature management process.

FIG. 11 is a diagram for explaining a reference feature management process.

In the example of FIG. 11, $f_{c26}$ represents channel 26 of the 64 channels of FIG. 9*a*. $f_r$ represents a reference information feature or reference information feature set. $f_{c26}'$ represents information decoded for reference after encoding, and may be input to a reference feature management unit 1100 and used as reference information. The reference feature management unit 1100 may configure and manage reference information and a reference information set using the input feature. At this time, in order to efficiently encode $f_{c26}$, $f_{c0}'$ which is a first channel with high similarity to $f_{c26}$shall be included in $f_r$. However, if encoding is performed in order of the feature channels, and the reference feature management unit 1100 manages the reference feature using a first in first out (FIFO) method, a problem may occur in which $f_{c0}'$ which is the first channel cannot be used as reference information when encoding $f_{c26}$.

In order to solve the above-mentioned problems, according to embodiments of the present disclosure, the channels of the feature map may be reordered based on correlation (or similarity) between channels for encoding/decoding. Additionally, prediction of the feature/feature map may be performed based on correlation between channels. Hereinafter. embodiments of the present disclosure will be described in detail with reference to the attached drawings.

Embodiment 1

According to Embodiment 1 of the present disclosure, channels of a feature/feature map may be reordered based on correlation (or similarity) between channels for encoding/decoding. Adjacent channels within reordered channels may have channel properties similar to each other. Here, channel properties may mean absolute values that may express features within a channel (e.g., feature average value, variance, etc.), or relative values acquired through comparison of features between channels (e.g., correlation coefficient, covariance, etc.). In the present disclosure, channel properties expressed as relative values may be referred to as correlation between channels. Correlation between channels may indicate the similarity of feature information (or feature values) between channels. Correlation between channels may be calculated based on various correlation analysis techniques, such as Pearson Correlation Coefficient analysis technique. Spearman Correlation Coefficient analysis technique, or Kendall Correlation Coefficient analysis technique. However, the above-described analysis techniques are merely examples, and the embodiments of the present disclosure are not limited thereto.

Figure 12:
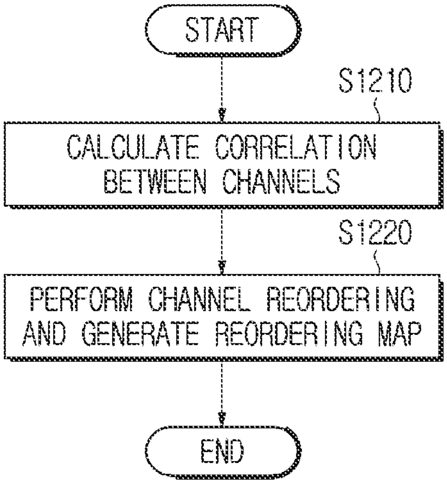
FIG. 12 is a flowchart showing a channel reordering method according to an embodiment of the present disclosure.

FIG. 12 is a flowchart showing a channel reordering method according to an embodiment of the present disclosure.

Each step in FIG. 12 may be performed by a channel reordering module. Depending on the embodiment, the channel reordering module may be implemented as an external module of the (VCM) encoder/decoder, or may be implemented inside the (VCM) encoder.

Referring to FIG. 12, the channel reordering module may acquire channel reordering information by calculating correlation between channels of the feature map (to be encoded/decoded) (S1210).

In one embodiment, channel reordering information may be calculated in the following manner.

(a) The correlation between the first channel of a feature map and all other channels is calculated to find a channel X with the highest correlation. Then, the correlation between the channel X and all other channels is calculated to find a channel Y with the highest correlation.

(b) The correlation between the channel Y and all other channels except the channel X is calculated to find a channel Z with the highest correlation.

(c) The process (b) is repeatedly performed for all channels to acquire correlation-based channel reordering information (e.g., channel-correlation mapping information).

The channel reordering module may reorder the channels of the feature map based on the acquired channel reordering information (S1220). Additionally, the channel reordering module may generate and store a reordering map to reconstruct the reordered channels in original order.

Figure 13:
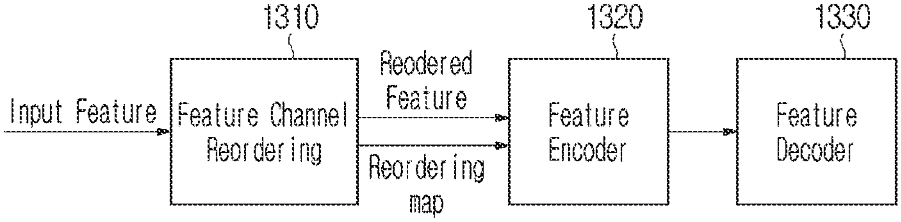
FIG. 13 is a diagram showing a VCM pipeline structure according to an embodiment of the present disclosure.

An example of a VCM pipeline structure including a channel reordering stage is shown in FIG. 13.

Referring to FIG. 13, in a first stage 1310, the channel reordering module may perform channel reordering on an input feature/feature map. The channel reordering module may transfer the reordered feature/feature map and the reordered maps to a (VCM) encoder. Additionally, the channel reordering module may encode channel reordering information and transfer it to the (VCM) encoder. The channel reordering information may include predetermined flag information (e.g., Feature_channel_reordering_flag) indicating whether a channel reordering process is performed. This is because the channel reordering process may be skipped depending on task purpose, system requirements, etc. Additionally, the channel reordering information may include predetermined flag information (e.g., Picture_level_channel_reordering_flag, Group_level_channel_reordering_flag, etc.) indicating the channel reordering unit. Depending on the embodiment, channel reordering information may be hierarchically encoded/signaled.

In a second stage 1320, the (VCM) encoder may encode the reordered feature/feature map received from the channel reordering module and transfer the feature/feature map encoding information to the (VCM) decoder. At this time, the encoding order may be in the order of reordered channels. Additionally, the (VCM) encoder may encode the above-described reordering map information and transfer it to a (VCM) decoder as additional information.

In a third stage 1330, the (VCM) decoder may reconstruct the feature/feature map by decoding the feature/feature map encoding information and reordering map information received from the (VCM) encoder. At this time, the decoding order may be in the order of reordered channels, and the reconstruction order may be the original channel order determined based on the reordered map information.

Figure 14:
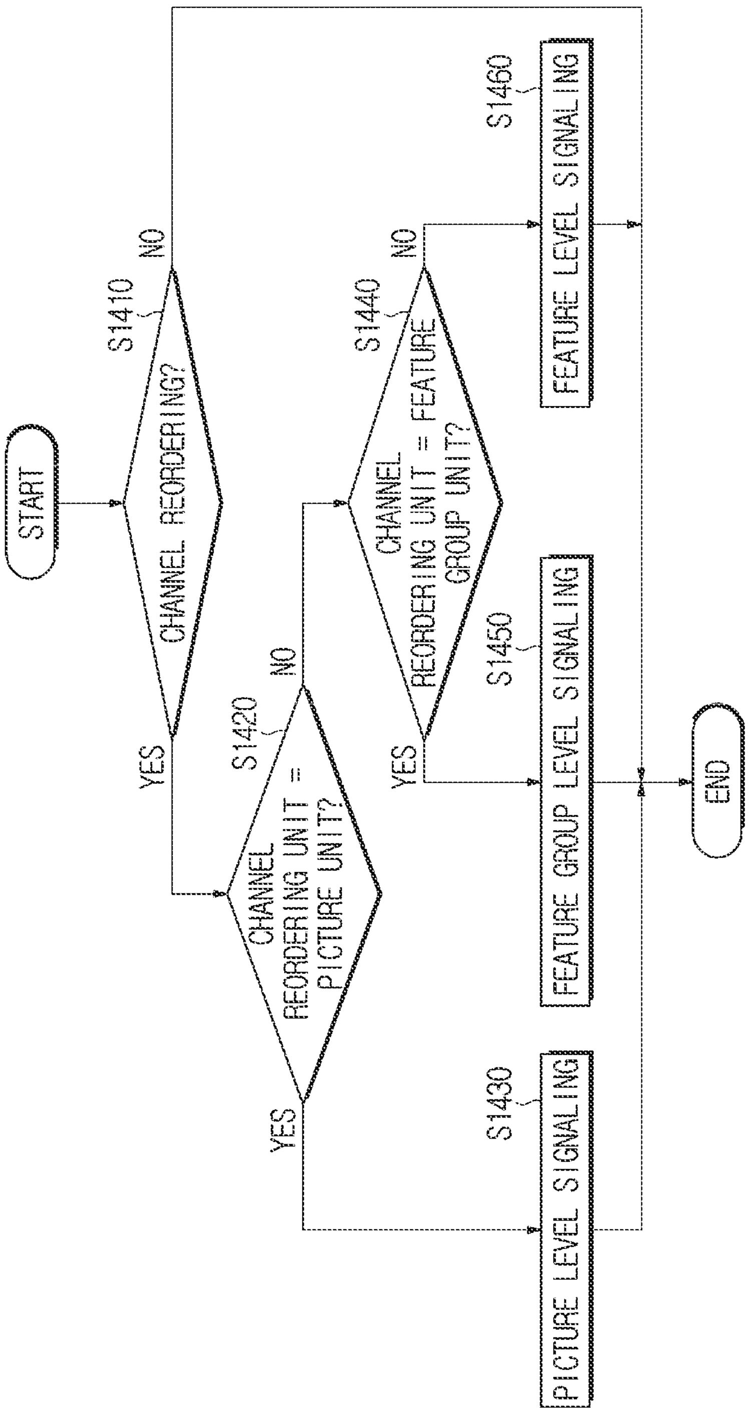
FIG. 14 is a flowchart illustrating an encoding/signaling process of channel reordering information according to an embodiment of the present disclosure.

FIG. 14 is a flowchart illustrating an encoding/signaling process of channel reordering information according to an embodiment of the present disclosure.

Referring to FIG. 14, a channel reordering module may determine whether to perform a channel reordering process and encode/signal first flag information (e.g., Feature_channel_reordering_flag) indicating this (S1410).

When the channel reordering process is not performed ('NO' of S1410). the channel reordering module may encode/signal the first flag information into a first value (e.g., 0), and end the encoding/signaling process of the channel reordering information.

In contrast, when the channel reordering process is performed ('YES' of S1410), the channel reordering module may encode/signal the first flag information into a second value (e.g., 1) and proceed to step S1420.

The channel reordering module may determine whether channels have been reordered in picture units and encode/signal second flag information (e.g., Picture level_channel_redoring_flag) indicating this (S1420).

When the channels are reordered in picture units ('YES' of S1420), the channel reordering module may encode/signal the second flag information into a second value (e.g., 1) and encode/signal channel reordering information (e.g., Number_of_channel. Feature_channel_order_count, etc.) at the picture level (first layer signaling) (S1430). In this case, channel reordering information may be applied equally to all feature sets (entire feature set level) extracted from the corresponding picture.

In contrast, when the channels are not reordered in picture units ('NO' in S1420), the channel reordering module may encode/signal the second flag information into a first value (e.g., 0) and proceed to step S1440.

The channel reordering module may determine whether channels have been reordered in feature group (or channel group) units and encode/signal third flag information (e.g., Group_level_channel_reordering_flag) indicating this (S1440).

When the channels are reordered in feature group units ('YES' of S1440), the channel reordering module may encode/signal the third flag information into a second value (e.g., 1), and encode/signal channel reordering information (e.g., Number_of_channel, Feature_channel_order_count, etc.) at the feature group level (second layer signaling) (S1450). In this case, the channel reordering information may be applied equally to all channels within the feature group.

On the other hand, when the channels are not reordered in feature group units ('NO' of S1440), the channel reordering module may encode/signal the third flag information into a first value (e.g., 0), and encode/signal channel reordering information (e.g., Number_of_channel, Feature_channel_order_count, etc.) at the feature level (third layer signaling) (S1460). In this case, the channel reordering unit may be determined to be a channel unit, and the channel reordering information may be applied individually to each channel.

As described above, channel reordering-related information may be hierarchically encoded/signaled at various levels. Accordingly, syntax including the channel reordering-related information may also be defined hierarchically.

FIGS. 15*a* and 15*b* are diagrams showing an example of feature sequence parameter sets according to an embodiment of the present disclosure. FIGS. 15*a* and 15*b* show an example of signaling channel reordering-related information at a highest layer.

First, referring to FIG. 15*a*, a feature sequence parameter set (Feature_sequence_parameter_set, F_SPS) may include a syntax element Feature_channel_reordering_flag.

The syntax element Feature_channel_reordering_flag may indicate whether the channel reordering process is performed. For example, Feature_channel_reordering_flag with a first value (e.g., 0) may indicate that a channel reordering process is not performed on the feature/feature map (to be encoded/decoded). In contrast, Feature_channel_reordering_flag with a second value (e.g., 1) may indicate that a channel reordering process is performed on the feature/feature map (to be encoded/decoded). In this case, information indicating the channel reordering unit (e.g., Picture_level_channel redoring_flag. Group_level_channel_reordering_flag) may be encoded/signaled within the lower layer syntax.

Next, referring to FIG. 15*b*, the feature sequence parameter set (F_SPS) may include a syntax element Feature_channel_reordering_flag indicating whether or not a channel reordering process is performed.

When the channel reordering process is performed (i.e., Feature_channel_reordering_flag=1), the feature sequence parameter set (F_SPS) may further include a syntax element Picture level channel reordering flag indicating the channel reordering unit.

The syntax element Picture level_channel reordering flag may indicate whether the channel reordering unit is a picture (or feature set) unit. For example, Picture_level_channel_reordering_flag with a first value (e.g. 0) may indicate that the channel reordering unit is not a picture unit. In contrast. Picture_level_channel_reordering_flag with a second value (e.g., 1) may indicate that the channel reordering unit is a picture unit. In this case, channel reordering-related information for all channels constituting the input feature/feature map may be encoded/signaled at the picture (or feature set) level.

When the channel unit reordering is not a picture unit (i.e., Picture level_channel_reordering_flag=0), the feature sequence parameter set (F_SPS) may further include a syntax element Group_level_channel_reordering_flag.

The syntax element Group_level_channel_reordering_flag may indicate whether the channel reordering a unit is feature group unit. For example, Group_level_channel_reordering_flag with a first value (e.g. 0) may indicate that the channel reordering unit is not a feature group unit. In this case, the channel reordering unit may be determined to be a channel unit. In contrast, Group_level_channel_reordering_flag with a second value (e.g., 1) may indicate that the channel reordering unit is a feature group unit. A feature group unit may refer to a case where a picture is divided into several small groups and encoded. In one example, the feature group unit may be a slice group unit or a tile group unit. In another example, the feature group unit may be a channel group unit.

In the case of FIG. 15*a*, since channel reordering-related information may be adaptively encoded for each layer, flexible changes are possible depending on the situation (e.g., task purpose, channel properties, etc.) for each feature. However, since the channel reordering-related information must be repeatedly signaled at the lower layer, the amount of additional information (signaling overhead) may increase. On the other hand, in the case of FIG. 15*b*, since the channel reordering-related information defined at the highest layer is used without change, the amount of additional information (signaling overhead) can be reduced, but a flexible change becomes difficult for each feature according to the situation. In order to solve these problems, depending on the embodiment, a predetermined duration may be set for the channel reordering-related information. For example, in the case of FIG. 15*a*, a relatively long duration may be set for channel reordering-related information signaled at the lower layer. Furthermore, during the duration, it may be constrained such that the channel reordering-related information is not signaled. Additionally, in the case of FIG. 15*b*, a relatively short duration may be set for channel reordering-related information signaled at the highest layer. Furthermore, after the duration expires, it may be constrained such that channel reordering-related information is signaled again even if the channels belong to the same feature sequence. Meanwhile, even before the expiration of the above-mentioned duration, if a predetermined event such as a scene transition occurs and an update of the channel reordering-related information is required, it may be constrained such that the channel reordering-related information is signaled again.

FIGS. 16*a* and 16*b* are diagrams showing an example of feature picture parameter sets according to an embodiment of the present disclosure.

First, referring to FIG. 16*a*, the feature picture parameter set (Feature picture parameter_set, F_PPS) may include a syntax element Picture_level_channel_reordering_flag indicating whether the channel reordering unit is a picture unit. The semantics of the syntax element Picture_level_channel_reordering_flag are as described above with reference to FIG. 15*b*.

When the channel reordering unit is a picture unit (i.e., Picture level_channel reordering flag=1), the feature picture parameter set (F_PPS) may further include syntax elements Number_of_channel and Feature_channel_order_count[i] related to the channel reordering map.

The syntax element Number_of_channel may indicate the total number of channels.

The syntax element Feature_channel_order_count[i] may indicate the original channel order (before reordering) of the i-th channel in the reordering order.

Feature_channel_order_countli[i] may be encoded/signaled as the total number of channels indicated by Number_of_channel, and may be used to reconstruct the reordered channels in the original channel order.

Next, referring to FIG. 16*b*, the feature picture parameter set (F_PPS) may include the syntax elements described above with reference to FIG. 16*a*.

In addition, when the channel reordering unit is not a picture unit (i.e., Picture_level_channel_reordering_flag=0), the feature picture parameter set (F_PPS) may further include a syntax element Picture level channel reordering flag indicating whether the channel reordering unit is a feature group unit. The semantics of the syntax element Picture level channel reordering flag are as described above with reference to FIG. 15*b*.

FIGS. 17*a* and 17*b* are diagrams showing an example of feature picture parameter sets according to an embodiment of the present disclosure.

First, referring to FIG. 17*a*, the feature group parameter set (Feature_group_parameter_set, F_GPS) may further include a syntax element Group_level_channel_reordering_flag indicating whether the channel reordering unit is a feature group unit. The semantics of the syntax element Group_level_channel_reordering_flag are as described above with reference to FIG. 15*b*. The syntax element Group_level_channel reordering flag may be encoded/signaled only when the channel reordering unit is not a picture unit (i.e., Picture_level_channel_reordering_flag=0).

When the channel reordering unit a feature group unit (i.e., Group_level_Channel_reordering_flag=1), the feature group parameter set (F_GPS) may further include syntax elements Number of group_channel and Feature_channel order_count[i] related to the channel reordering map.

The syntax element Number_of_group_channel may indicate the total number of channels in the feature group.

The syntax element Feature_channel_order_count[i] may indicate the original channel order (before reordering) of the i-th channel in the reordering order. Feature_channel_order_count[i] may be encoded/signaled as the total number of channels in the feature group indicated by Number_of_group_channel, and may be used to reconstruct the reordered channels in the original channel order.

Next, referring to FIG. 17*b*, the feature group parameter set (F_GPS), unlike the feature group parameter set (F_GPS) of FIG. 17*a*, may not include a syntax element Group_level_channel_reordering_flag indicating whether the channel reordering unit is a feature group unit. In this case, the syntax element Group_level_channel_reordering_flag may be encoded/signaled in higher layer syntax, for example, the feature picture parameter set (F_PPS) of FIG. 16*b*. Except for these differences, the feature group parameter set (F_GPS) of FIG. 17*b* may have the same syntax structure as the feature picture parameter set (F_PPS) of FIG. 17*a*.

Figures 18, 19, 20:
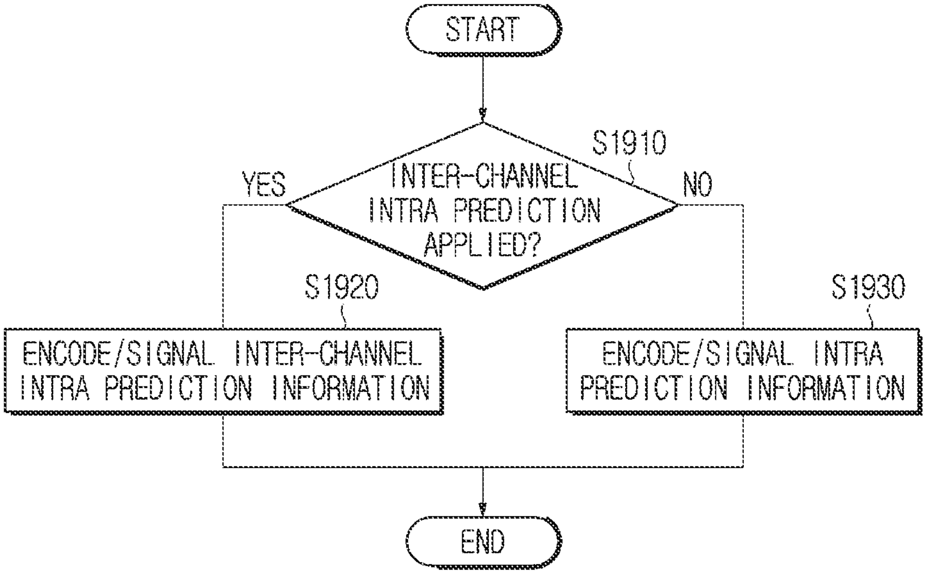
FIG. 18 is a diagram illustrating an example of a feature parameter set according to an embodiment of the present disclosure.
FIG. 19 is a flowchart illustrating an encoding/signaling process of intra prediction information according to an embodiment of the present disclosure.
FIG. 20 is a diagram illustrating an example of feature coding unit syntax according to an embodiment of the present disclosure.

FIG. 18 is a diagram illustrating an example of a feature parameter set according to an embodiment of the present disclosure.

Referring to FIG. 18, a feature parameter set (Feature_parameter_set, F_PS) is a parameter set applied to each channel and may include a syntax element Feature_channel order_count.

The syntax element Feature_channel_order_count may indicate the original channel order (before reordering) of a specific channel to which the feature parameter set (F_PS) is applied. The syntax element Feature_channel_order_count may be encoded/signaled only when the channel reordering unit is not both a picture unit and a feature group unit (i.e., !Picture_level_channel_reordering_flag && !Group_level_channel_reordering_flag).

As described above, according to Embodiment 1 of the present disclosure, the channels of the feature/feature map may be reordered based on correlation (or similarity) between channels for encoding/decoding. Channels adjacent to each other within reordered channels may have high correlation. Accordingly, similar to existing video codec techniques, since the feature/feature map may be encoded/decoded by referencing adjacent channels, complexity (due to reference channel search, etc.) can be reduced and coding efficiency can be further improved. Additionally, according to Embodiment 1 of the present disclosure, channel reordering-related information may be hierarchically/adaptively encoded/signaled at a feature sequence level, picture level, feature group level, and/or feature level. Accordingly, signaling overhead can be reduced and coding flexibility can be further improved.

Embodiment 2

According to Embodiment 2 of the present disclosure, two types of intra prediction may be applied to a feature/ feature map. Specifically, a first type of intra prediction, which predicts a current block by referencing already reconstructed samples in a current channel, may be applied to a feature/feature map. The first type of intra prediction may correspond to intra prediction of existing video codecs (e.g., H.265. H.266, etc.). Additionally, a second type of intra prediction, which predicts a current block by referencing already reconstructed samples in a channel different from a current channel, may be applied to a feature/feature map. The second type of intra prediction may be referred to as inter-channel prediction or inter-channel intra prediction to be distinguished from the first type of intra prediction.

In the case of inter-channel intra prediction, since prediction may be performed using samples that are present at the same spatial location as the current block in the previous channel in the encoding/decoding order, prediction efficiency and accuracy may be higher than existing intra prediction that references spatially adjacent samples. Meanwhile, when the channels of the feature map are reordered, channels with high correlation (or similarity) may be placed around the current channel. Accordingly, since inter-channel intra prediction may be performed based on more similar adjacent channels, prediction efficiency and accuracy can be further improved. Considering this, it is obvious that Embodiment 2 of the present disclosure may be implemented in combination with Embodiment 1 described above.

Assuming that channel 0) is encoded first and channel I is encoded second within the feature map, the two types of intra prediction described above may be applied to each channel as follows. When the current channel to be encoded is channel 0, since an already encoded channel is not present before channel 0, only the first type of intra prediction may be applied to channel 0). On the other hand, when the current channel to be encoded is channel 1, since channel 0 is present before channel 1, both the first type of intra prediction and the second type of intra prediction may be applied to channel 1.

In the case of existing video codecs, i) non-directional modes (e.g., 0): Planar mode, 1: DC mode) are assigned to modes 0 and 1, and ii) directional modes are assigned to mode 2 and higher. On the other hand, according to Embodiment 2 of the present disclosure, i) the above-described inter-channel intra prediction may be assigned to mode 0, ii) a non-directional mode may be assigned to modes 1 and 2, and ili) directional modes may be assigned to modes3 or higher.

Meanwhile, certain flag information (e.g., inter_channel_prediction) may be encoded/signaled to indicate whether the second type of intra prediction is applied.

FIG. 19 is a flowchart illustrating an encoding/signaling process of intra prediction information according to an embodiment of the present disclosure.

Referring to FIG. 19, an encoding apparatus may determine whether to apply inter-channel intra prediction to a current block and encode/signal first flag information (e.g., inter_channel_prediction) indicating this (S1910). Since the selection ratio of inter-channel intra prediction may be higher than the selection ratio of (first type of) intra prediction when considering prediction efficiency and accuracy, it is preferentially determined whether to apply inter-channel intra prediction.

When inter-channel intra prediction is applied to the current block ('YES' of S1910). the encoding apparatus may encode/signal information about inter-channel intra prediction. such as an identifier (id) of a reference channel (S1920).

In contrast, when inter-channel intra prediction is not applied to the current block ('NO' of S1910), the encoding apparatus may encode/signal information about intra prediction, such as the prediction mode number (S1930).

FIG. 20 is a diagram illustrating an example of feature coding unit syntax according to an embodiment of the present disclosure.

Referring to FIG. 20, the feature coding unit syntax (Feature_coding_unit) may include a syntax element inter_channel_prediction regarding whether to apply inter-channel intra prediction.

The syntax element inter_channel prediction may indicate whether inter-channel intra prediction is applied to the current block. For example, inter_channel_prediction with a first value (e.g., 0) may indicate that inter-channel intra prediction is not applied to the current block.

In contrast, inter_channel_prediction with a second value (e.g., 1) may indicate that inter-channel intra prediction is applied to the current block.

When inter-channel intra prediction is applied to the current block (i.e., inter_channel_prediction=1), information about inter-channel intra prediction may be encoded/signaled within the feature coding unit syntax (Feature_coding_unit).

In contrast, when inter-channel intra prediction is not applied to the current block (i.e., inter_channel_prediction=0), information about intra prediction may be encoded/signaled within the feature coding unit syntax (Feature_coding_unit).

As described above, according to Embodiment 2 of the present disclosure, a first type of intra prediction referencing at least one already coded adjacent sample in the current channel. and a second type of intra prediction referencing at least one sample in an already coded channel different from the current channel may be provided. In the case of the second type of intra prediction, since prediction may be performed by referencing at least one sample present in the same spatial location as the current block within an adjacent channel, prediction efficiency and accuracy are improved compared to existing intra prediction.

Embodiment 3

Figure 21A:
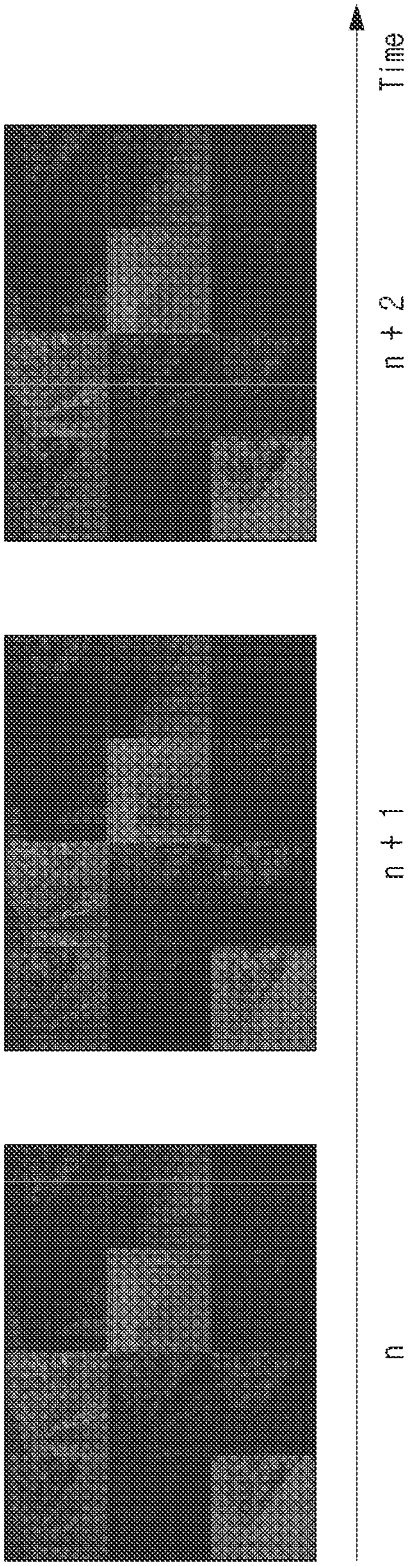
FIG. 21*a* is a diagram showing an example of continuously extracted feature maps.
Figure 21B:
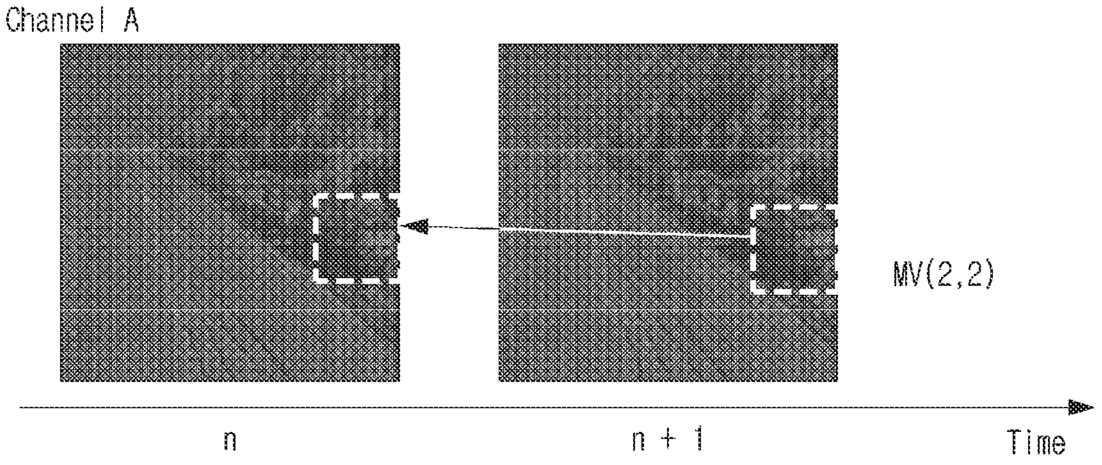
FIGS. 21*b* and 21*c* are diagrams showing a comparison of two corresponding channels among the feature maps of FIG. 21*a*.
Figure 21C:
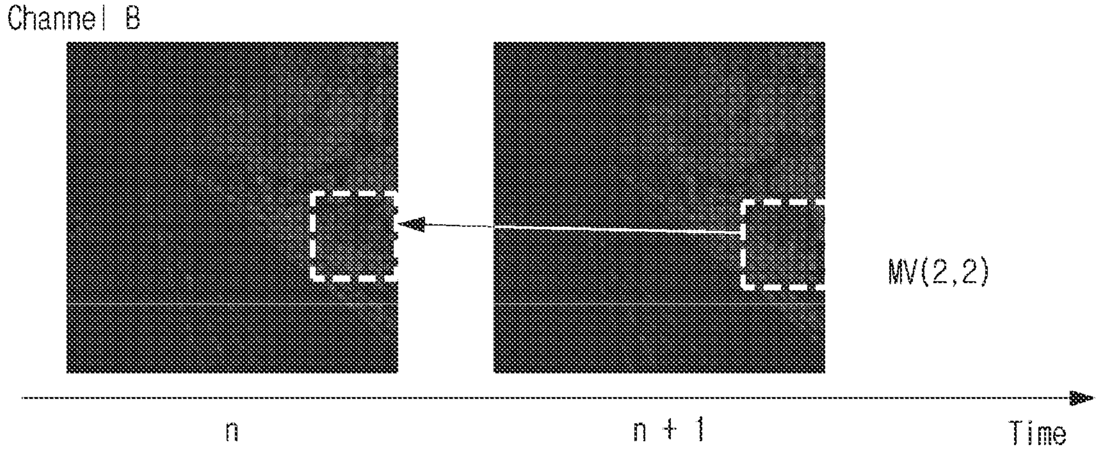

FIG. 21*a* is a diagram showing an example of continuously extracted feature maps, and FIGS. 21*b* and 21*c* are diagrams showing a comparison of two corresponding channels among the feature maps of FIG. 21*a*.

As described above, the similarity (or correlation) of data distribution characteristics between channels and the distance between channels may be non-linear. Referring to FIG. 21*a*. in order to encode the feature map at Time (n+1) among the continuously extracted feature maps, the already coded feature map at Time (n) may be referenced. At this time, since the similarity between channels in data distribution characteristics is not relatively high, the increase in coding efficiency may not be significant when referencing the data itself of other channels. However, since the similarity between channels of prediction information (e.g., motion vector) is relatively high, an increase in coding efficiency may be expected when referencing prediction information of other channels. Specifically, referring to FIGS. 21*b* and 21*c*, it can be seen that while the data distribution characteristics between channel A and channel B are different, the motion vector information (MV) between Time (n) and Time (n+1) features is (2, 2) in both channel A and channel B.

According to Embodiment 3 of the present disclosure, inter prediction based on reference blocks of the current channel and adjacent channel may be applied to the feature/feature map, considering the above-described channel properties. Inter prediction based on the reference block of the adjacent channel may be referred to as inter-channel inter prediction.

When the channels of the feature map are reordered, channels with high correlation (or similarity) may be placed around the current channel. Accordingly, since inter-channel inter prediction may be performed based on more similar adjacent channels, prediction efficiency and accuracy can be further improved. Considering this, it is obvious that Embodiment 3 of the present disclosure may be implemented in combination with Embodiment 1 described above.

The reference block of the adjacent channel may construct a prediction information candidate (PIC) list for inter prediction of the current block along with an existing spatial neighboring block (spatial candidate). The reference block of the adjacent channel constituting the prediction information candidate list may be referred to as an inter-channel candidate.

In one embodiment, at least one of the maximum size of the prediction information candidate (PIC) list (e.g., MaxNumPICList), the maximum number of inter-channel candidates (e.g, MaxNumInterChannelCandidate), the maximum number of spatial candidates (e.g., MaxNumSpatialCandidate), or priority information of the prediction information candidates (e.g., InterChannelCandidataPriority_flag, SpatialCandidataPriority_flag, etc.) may be predefined. In this case, the prediction information candidate (PIC) list may be constructed based on the predefined information.

Figure 22A:
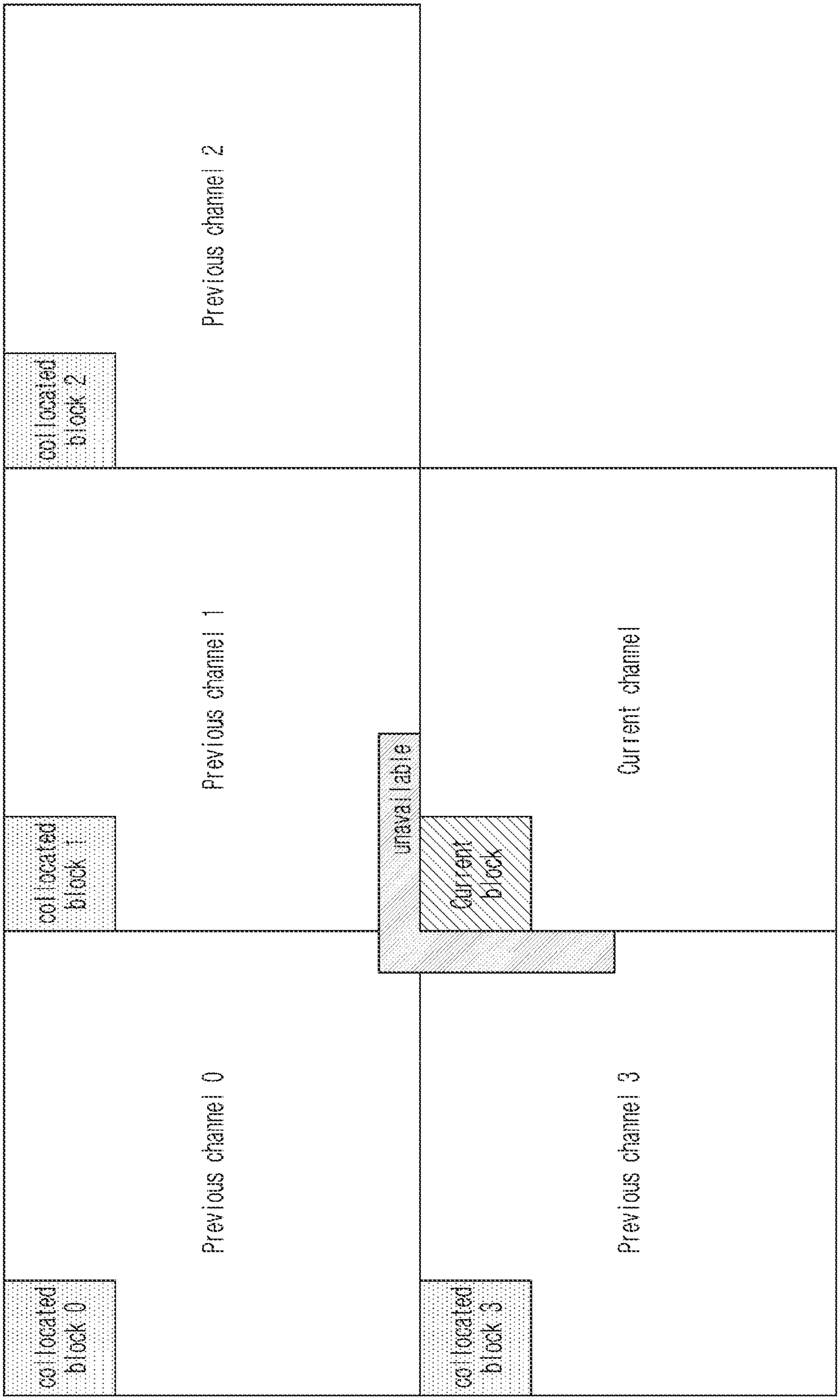
FIGS. 22*a* to 22*c* are diagrams for explaining a method of constructing a prediction information candidate (PIC) list.
Figure 22B:
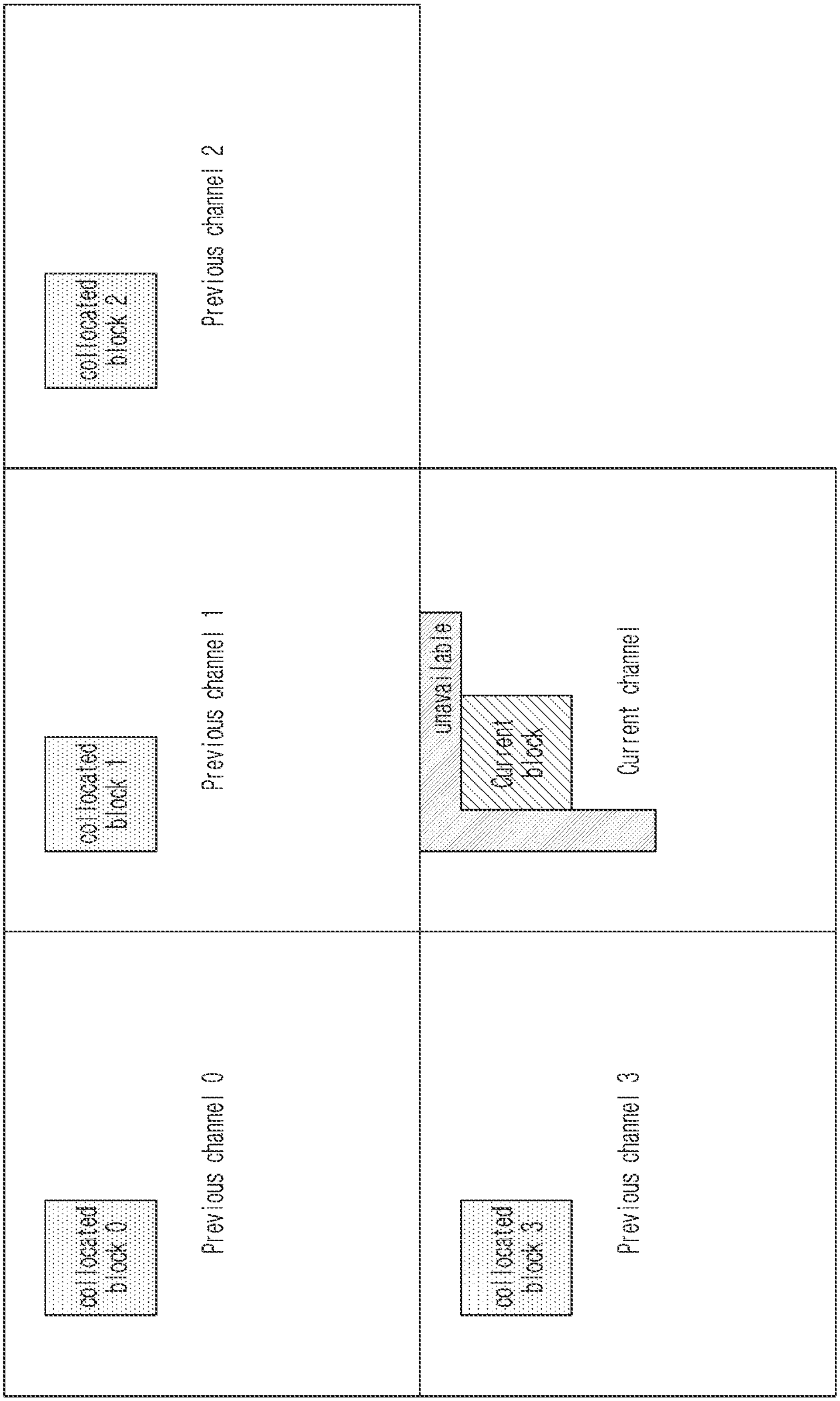
Figure 22C:
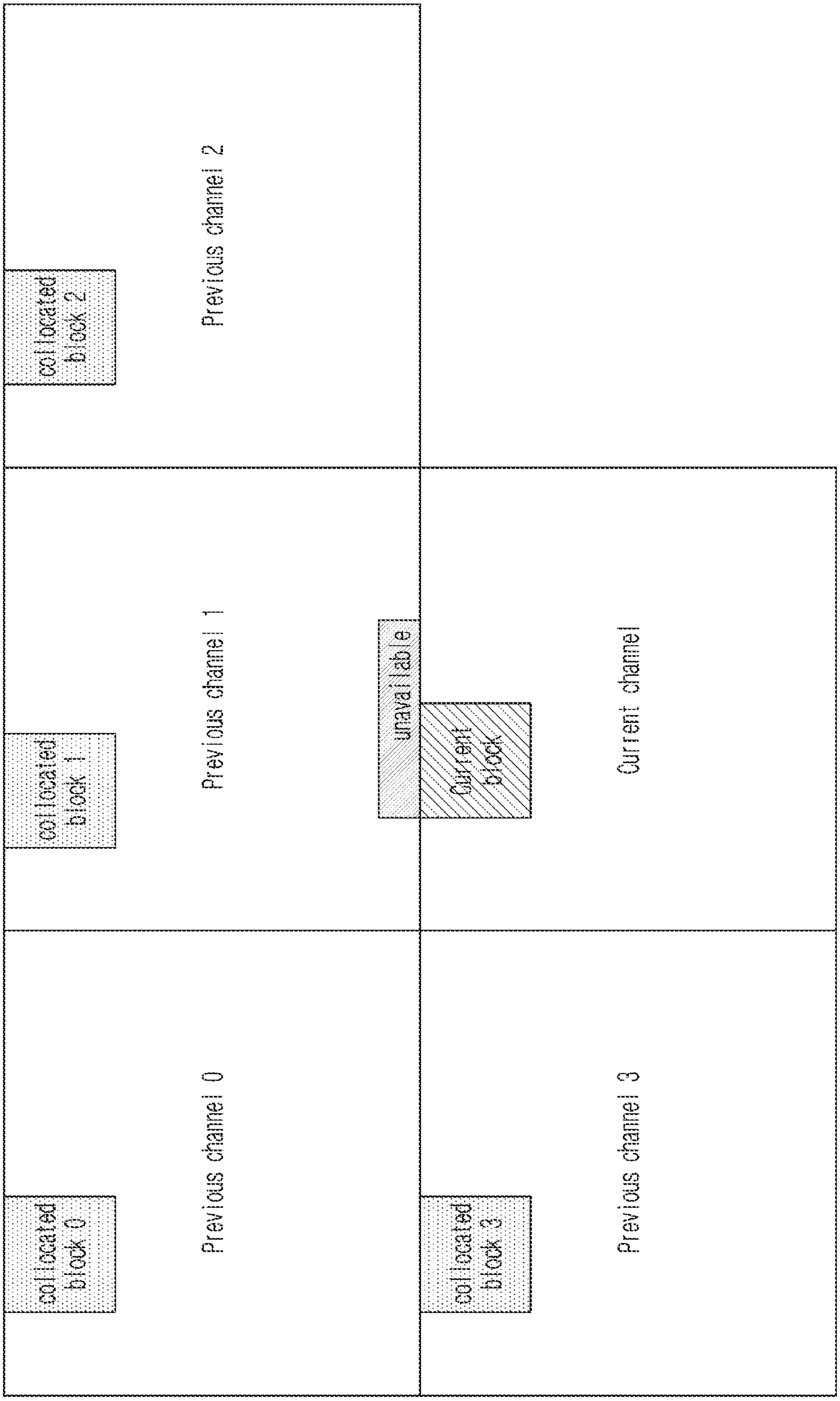

FIGS. 22*a* to 22*c* are diagrams for explaining a method of constructing a prediction information candidate (PIC) list.

First, referring to FIG. 22*a*, when all already coded neighboring blocks of a current block belong to a channel different from a current channel (e.g., channel 5) (boundary discontinuity) or are unavailable, the neighboring blocks may not be used as spatial candidates. In this case, the prediction information candidate (PIC) list may be constructed using only collocated blocks of already coded adjacent channels (e.g., channels 0 to 3).

Next, referring to FIG. 22*b*, when all already coded neighboring blocks of the current block belong to the current channel (e.g., channel 5) and are available, the neighboring blocks may be used as spatial candidates. In this case, the prediction information candidate (PIC) list may be constructed using at least some of the neighboring blocks and collocated blocks of already coded adjacent channels (e.g., channels 0 to 3). For example, when the maximum size of the PIC list is 5, the maximum number of spatial candidates is 1, and the inter-channel candidate has higher priority than the spatial candidate, the PIC list may be composed of collocated blocks of 4 already coded adjacent channels (eg., channels 0 to 3) and one upper neighboring block.

Next, referring to FIG. 22*c*, when only some of the already coded neighboring blocks of the current block belong to a channel different from the current channel (e.g., channel 5) (boundary discontinuity) or are unavailable, the prediction information candidate (PIC) list may be constructed using at least some of the available neighboring blocks and collocated blocks of already coded adjacent channels (e.g., channels 0 to 3). For example, if the maximum size of the PIC list is 5, the maximum number of spatial candidates is 3, and the spatial candidate has higher priority than the inter-channel candidate, the PIC list may be constructed using two left and top left neighboring blocks and collocated blocks of two already coded adjacent channels (e.g., channel 0 and channel 1).

Unlike the examples of FIGS. 22*a* to 22*c*, if there are no available spatial candidates and inter-channel candidates. the prediction information candidate (PIC) list may not be constructed. In this case, certain motion information, for example, zero motion information. may be used for inter prediction of the current block.

FIG. 23 is a diagram illustrating an example of a feature sequence parameter set according to an embodiment of the present disclosure.

Referring to FIG. 23, the feature sequence parameter set (Feature_sequence_parameter_set, F_SPS) may include syntax elements PIC_flag. MaxNumPICList, MaxNumInterChannelCandidate. MaxNumSpatialCandidate, InterChannelCandidataPriority_flag, and SpatialCandidataPriority_flag related to the prediction information candidate (PIC) list.

The syntax element PIC flag may indicate whether a prediction information candidate (PIC) list is constructed (or whether prediction information of a neighboring block and a previous channel is utilized). For example, PIC_flag with a first value (e.g., 0) may indicate that a prediction information candidate (PIC) list is not constructed. In contrast. PIC_flag with a second value (e.g., 1) may indicate that a prediction information candidate (PIC) list is constructed. In addition, only in this case, the remaining syntax elements described above may be encoded/signaled.

The syntax element MaxNumPICList may indicate the maximum size of the prediction information candidate (PIC) list.

The syntax element MaxNumInterChannelCandidate may indicate the maximum number of inter-channel candidates in the prediction information candidate (PIC) list.

The syntax element MaxNumSpatialCandidate may indicate the maximum number of spatial candidates in the prediction information candidate (PIC) list. When MaxNumInterChannelCandidate is defined, since MaxNumSpatialCandidate may be derived from MaxNumPICList-MaxNumInterChannelCandidate, MaxNumSpatialCandidate may be optional. Conversely, when MaxNumSpatialCandidate is defined, since Max NumInterChannelCandidate may be derived from MaxNumPICList-MaxNumSpatialCandidate, and thus MaxNumInterChannelCandidate may also be optional. Accordingly, MaxNumInterChannelCandidate and MaxNumSpatial Candidate may be encoded optionally. Alternatively, both the two syntax elements may be encoded, but may be optionally parsed depending on the decoder's decision, if necessary.

Constraints according to Max NumSpatialCandidate or MaxNumInterChannelCandidate may vary depending on the number of collocated blocks and neighboring blocks of the available previous channel. For example, if application of spatial candidates is not possible, constraints according to MaxNumInterChannelCandidate are ignored and inter channel candidates may be filled up to MaxNumPICList. For example, when MaxNumPICList is 6 and MaxNumInterChannelCandidate is 3, if there are no available spatial candidates, a prediction information candidate (PIC) list may be constructed using 6 inter-channel candidates Alternatively, when MaxNumPICList is 6 and MaxNumInterChannelCandidate is 3, if only 1 spatial candidate is available, a prediction information candidate (PIC) list may be constructed using 1 spatial candidate and 5 inter-channel candidates. Alternatively, if there are no available inter-channel candidates, a prediction information candidate (PIC) list may be constructed using spatial candidates of up to MaxNumPICList, regardless of the value of MaxNumSpatialCandidate.

Figure 24:
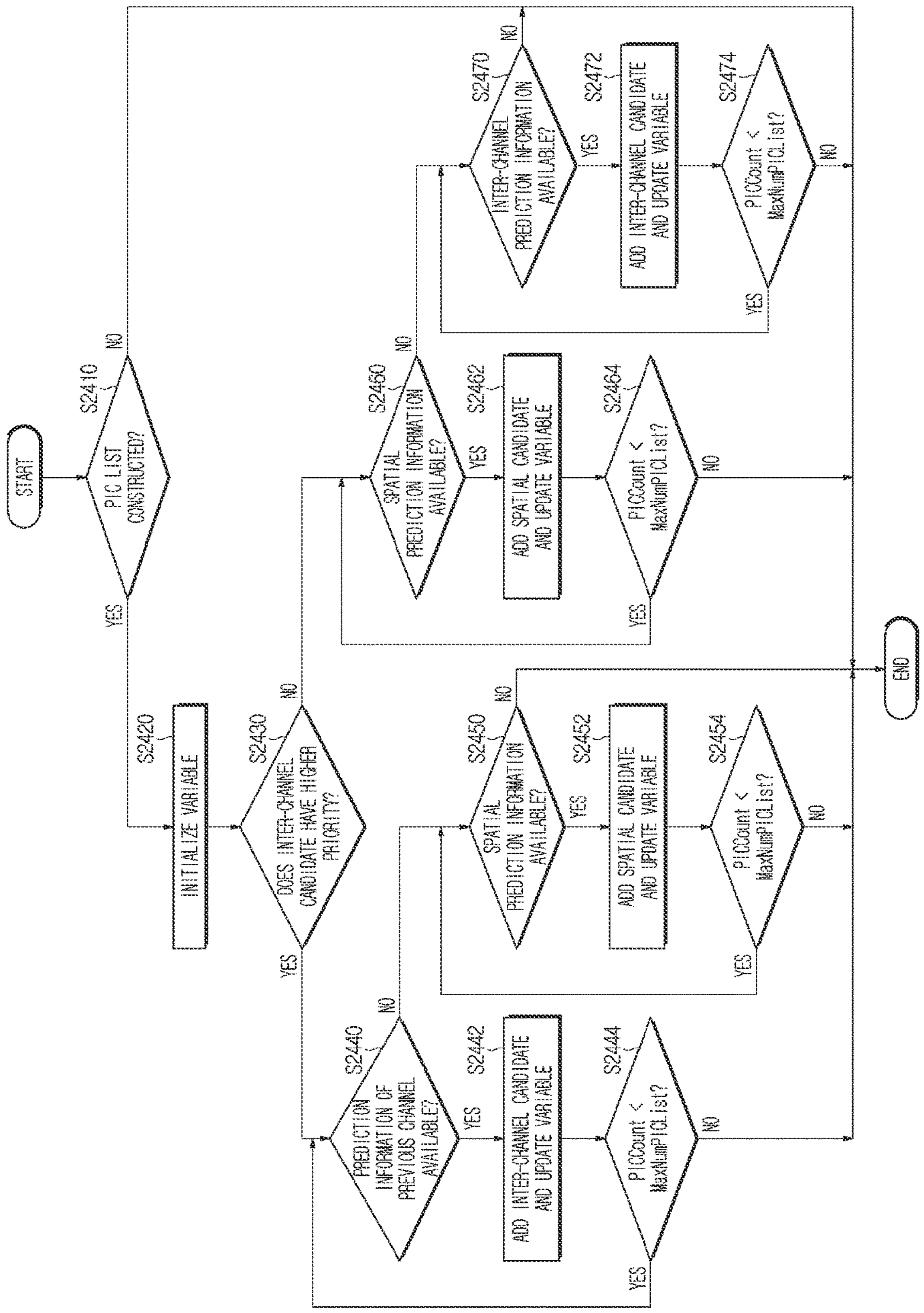
FIG. 24 is a flowchart illustrating a method of constructing a prediction information candidate (PIC) list according to an embodiment of the present disclosure.

FIG. 24 is a flowchart illustrating a method of constructing a prediction information candidate (PIC) list according to an embodiment of the present disclosure. The method of FIG. 24 may be performed equally in an encoding apparatus and a decoding apparatus. Hereinafter, for convenience of explanation, the description will be based on the encoding apparatus.

Referring to FIG. 24, the encoding apparatus may determine whether to construct a prediction information candidate (PIC) list, and encode a syntax element PIC flag indicating this (S2410).

Upon determining that the prediction information candidate (PIC) list is not constructed ('NO' of S2410), the encoding apparatus may encode PIC_flag into a first value (e.g., 0) and end all processes.

In contrast, upon determining that the prediction information candidate (PIC) list is constructed ('YES' of S2410), the encoding apparatus may encode PIC_flag into a second value (e.g., 1) and proceed to step S2420. The encoding apparatus may initialize a variable InterChannelCandidateCount indicating the number of inter-channel candidates, a variable SpatialCandiateCount indicating the number of spatial candidates, and a variable PICCount indicating the size of the prediction information candidate (PIC) list to 0 (S2420).

The encoding apparatus may determine whether the inter-channel candidate has higher priority than a spatial candidate within the prediction information candidate (PIC) list and encode the syntax element InterChannelCandidatePriority_flag indicating this (S2430).

If the inter-channel candidate has higher priority than the spatial candidate within the prediction information candidate (PIC) list ('YES' of S2430), the encoding apparatus may encode InterChannelCandidatePriority_flag into a second value (e.g., 1) and proceed to step S2440. The encoding apparatus may determine whether prediction information of a previous channel is available (S2440). Here, the previous channel may follow the reverse of the encoding order For example, if the encoding order is channel 0→channel 1→channel 2, the previous channel may be used in the order of channel 2→channel 1→channel 0.

When the prediction information of the previous channel is available ('YES' of S2440). the encoding apparatus may add the inter-channel candidate to the prediction information candidate (PIC) list and then increase the values of the above-mentioned InterChannelCandidateCount and PICCount by 1 (S2442). Additionally, the encoding apparatus may determine whether the value of PICCount is smaller than the maximum size (e.g, MaxNumPICList) of the predefined prediction information candidate (PIC) list (S2444).

When the value of PICCount is smaller than the maximum size (e.g., MaxNumPICList) of the predefined prediction information candidate (PIC) list ('YES' of S2444), the encoding apparatus may return to step S2440 and determine whether the prediction information of the previous channel is additionally available or not.

In contrast, when the value of PICCount is greater than or equal to the maximum size (e.g., MaxNumPICList) of the predefined prediction information candidate (PIC) list ('NO' of S2444), the encoding apparatus may end all processes.

When the prediction information of the previous channel is not available ('NO' of S2440), the encoding apparatus may determine whether spatial prediction information is available (S2450).

When the spatial prediction information is available ('YES' of S2450), the encoding apparatus may add the spatial candidate to the prediction information candidate (PIC) list and then increase the values of SpatialCandiateCount and PICCount described above by 1 (S2452). Additionally, the encoding apparatus may determine whether the value of PICCount is smaller than the maximum size (e.g., MaxNumPICList) of the predefined prediction information candidate (PIC) list (S2454).

When the value of PICCount is smaller than the maximum size (e.g., MaxNumPICList) of the predefined prediction information candidate (PIC) list ('YES' of S2454), the encoding apparatus may return to step S2450 and determine whether spatial prediction information may be additionally available.

In contrast, when the value of PICCount is greater than or equal to the maximum size (e.g., MaxNumPICList) of the predefined prediction information candidate (PIC) list ('NO' of S2454), the encoding apparatus may end all processes.

When the spatial candidate is not available ('NO' of S2450), the encoding apparatus may end all processes.

When the inter-channel candidate has lower priority than the spatial candidate in the prediction information candidate (PIC) list ('NO' of S2430), the encoding apparatus may encode InterChannelCandidatePriority_flag into a first value (e.g., 0) and proceed to step S2460. The encoding apparatus may determine whether spatial prediction information is available (S2460).

When spatial prediction information is available ('YES' of S2460), the encoding apparatus may add the spatial candidate to the prediction information candidate (PIC) list and then increase the values of SpatialCandiateCount and PICCount described above by 1 (S2462). Additionally, the encoding apparatus may determine whether the value of PICCount is smaller than the maximum size (e.g., MaxNumPICList) of the predefined prediction information candidate (PIC) list (S2464).

When the value of PICCount is smaller than the maximum size (e.g., MaxNumPICList) of the predefined prediction information candidate (PIC) list ('YES' of S2464), the encoding apparatus may returns to step S2460 and determine whether spatial prediction information is additionally available.

In contrast, when the value of PICCount is greater than or equal to the maximum size (e.g, MaxNumPICList) of the predefined prediction information candidate (PIC) list ('NO' of S2464), the encoding apparatus may end all processes.

When the spatial candidate is not available ('NO' of S2460), the encoding apparatus may determine whether inter-channel prediction information is available (S2470).

When inter-channel prediction information is available ('YES' of S2470), the encoding apparatus may add the inter-channel candidate to the prediction information candidate (PIC) list and then increase the values of the above-mentioned InterChannelCandidateCount and PICCount by 1 (S2472). Additionally, the encoding apparatus may determine whether the value of PICCount is smaller than the maximum size (e.g., MaxNumPICList) of the predefined prediction information candidate (PIC) list (S2474).

When the value of PICCount is smaller than the maximum size (e.g., MaxNumPICList) of the predefined prediction information candidate (PIC) list ('YES' of S2474), the encoding apparatus may return to step S2470 and determine whether the prediction information of the previous channel is additionally available.

In contrast, when the value of PICCount is greater than or equal to the maximum size (e.g., MaxNumPICList) of the predefined prediction information candidate (PIC) list ('NO' of S2474), the encoding apparatus may end all processes.

When inter-channel prediction information is not available ('NO' of S2470), the encoding apparatus may end all processes.

To summarize the method of FIG. 24, the encoding apparatus may first add a candidate with high priority among inter-channel candidates and spatial candidates to the prediction information candidate (PIC) list. In addition, if the prediction information candidate (PIC) list is not completely filled, candidates with low priority may be added to the prediction information candidate (PIC) list. At this time, if there are more than MaxNumPICList high-priority candidates, the prediction information candidate (PIC) list may be filled only with the high-priority candidates. That is, the prediction information candidate (PIC) list is filled with only spatial candidates or inter prediction candidates. In this case, the diversity of candidates may decrease, which may have a negative impact on coding efficiency.

On the other hand, when constructing a prediction information candidate (PIC) list based on MaxNumInterChannelCandidate and MaxNumSpatialCandidate according to Embodiment 3 of the present disclosure, there is an advantage of securing diversity of candidates by limiting the maximum number of candidate types. For example, if inter-channel candidates have high priority, the prediction information candidate (PIC) list may first be filled with inter-channel candidates by MaxNumInterChannelCandidate, and then spatial candidates may be added to the prediction information candidate (PIC) list. Thereafter, if the number of candidates filled in the prediction information candidate (PIC) list is less than MaxNumPICList, the inter prediction candidate may be added to the prediction information candidate (PIC) list again. On the other hand, if the spatial candidate has high priority, the prediction information candidate (PIC) list may first be filled with spatial candidates by MaxNumSpatialCandidate, and then the inter-channel candidate may be added to the prediction information candidate (PIC) list. Thereafter, when the number of candidates filled in the prediction information candidate (PIC) list is less than MaxNumPICList, the spatial candidate may be added to the prediction information candidate (PIC) list again.

When the construction of the prediction information candidate (PIC) list is completed, the encoding apparatus may select a candidate with the highest coding efficiency among the configured candidates. Then, the encoding apparatus may encode information indicating the selected candidate and signal it to the decoding apparatus. The information may be encoded/signaled, for example, within the syntax of FIGS. 25*a* and 25*b*.

Figures 25A, 25B, 26:
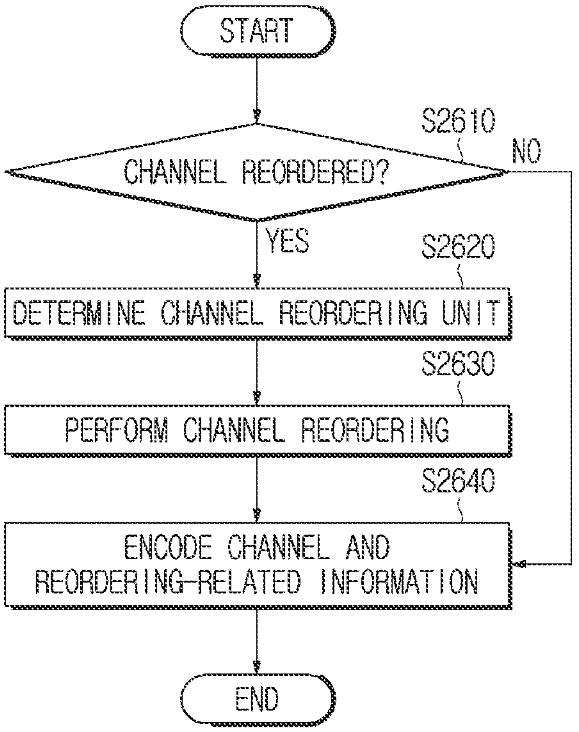
FIGS. 25*a* and 25*b* are diagrams showing an example of feature coding syntax according to an embodiment of the present disclosure.
FIG. 26 is a flowchart illustrating a feature encoding method according to an embodiment of the present disclosure.

FIGS. 25*a* and 25*b* are diagrams showing an example of feature coding syntax according to an embodiment of the present disclosure.

First, referring to FIG. 25*a*, the feature coding syntax (Feature_Coding) syntax may include a syntax element PIC_idx[channel_number][x0][y0] indicating the prediction information candidate selected for a current block of a current channel. The syntax element PIC_idx[channel_number][x0][y0] may be encoded/signaled only when the prediction mode of the current block is a prediction information candidate mode (i.e., Pred_mode=PIC mode), as a case where a prediction information candidate (PIC) list is constructed for the current block (i.e., PIC_flag=1).

Next, referring to FIG. 25*b*, the feature coding syntax (Feature_Coding) syntax may include a syntax element PIC_idx[channel_number][x0][y0] as in the case of FIG. 25*a*. However, the signaling conditions of the syntax element PIC_idx[channel_number][x0][y0] may be different from the case of FIG. 25*a*. Specifically, in determining whether the prediction mode of the current block is a prediction information candidate mode, in the case of FIG. 25*b*, separate flag information (i.e., PIC_Pred_flag) rather than Pred_mode may be used As described above, according to Embodiment 3 of the present disclosure, inter prediction based on inter-channel candidates may be applied to the feature/feature map. Since the inter-channel similarity of prediction information is relatively high, coding efficiency can be further improved by referencing the prediction information of the collocated block of a previous channel (inter-channel inter prediction). Additionally, according to Embodiment 3 of the present disclosure, a prediction information candidate (PIC) list including inter-channel candidates and spatial candidates may be constructed. At this time, coding efficiency can be further improved by limiting the maximum number of candidate types to secure diversity of candidates.

Encoding/Decoding Method

Hereinafter, a feature encoding/decoding method according to an embodiment of the present disclosure will be described in detail with reference to FIGS. 26 and 27.

FIG. 26 is a flowchart illustrating a feature encoding method according to an embodiment of the present disclosure. The feature information encoding method of FIG. 26 may be performed by the encoding apparatus of FIG. 1.

Referring to FIG. 26, the encoding apparatus may determine whether to reorder a plurality of channels included in a current feature map (S2610).

Upon determining that the plurality of channels is reordered ('YES' of S2610), the encoding apparatus may determine a reordering unit of the plurality of channels (S2620).

The encoding apparatus may reorder the plurality of channels based on the determined reordering unit (S2630).

Then, the encoding apparatus may encode the plurality of channels and the reordering-related information (S2640). At this time, the reordering-related information may include first information about whether to reorder the plurality of channels (e.g., Feature channel reordering_flag), second information about the determined reordering unit (e.g, Picture_level_channel_reordering_flag, Group_level_channel_reordering_flag), and third information about the order before the reordering of the plurality of channels (e.g., Number_of_group_channel, Feature_channel_order_count).

In contrast, upon determining that the plurality of channels is not reordered ('NO' of S2610), the encoding apparatus may encode the plurality of channels and the reordering-related information without performing channel reordering (S2640). At this time, the reordering-related information may include only the first information about whether to reorder the plurality of channels.

In one embodiment, the reordering unit may include a picture unit, a feature group unit, and a channel unit.

In one embodiment, the third information may be encoded within a parameter set at a level determined based on the reordering unit.

In one embodiment, at least one first block included in the plurality of channels may be encoded based on intra prediction, and the intra prediction may be performed already reconstructed reference samples included in a channel different from the first block.

In one embodiment, at least one second block included in the plurality of channels may be encoded based on inter prediction, and the inter prediction may be performed based on prediction information of an already reconstructed reference block included in a channel different from the second block.

Figure 27:
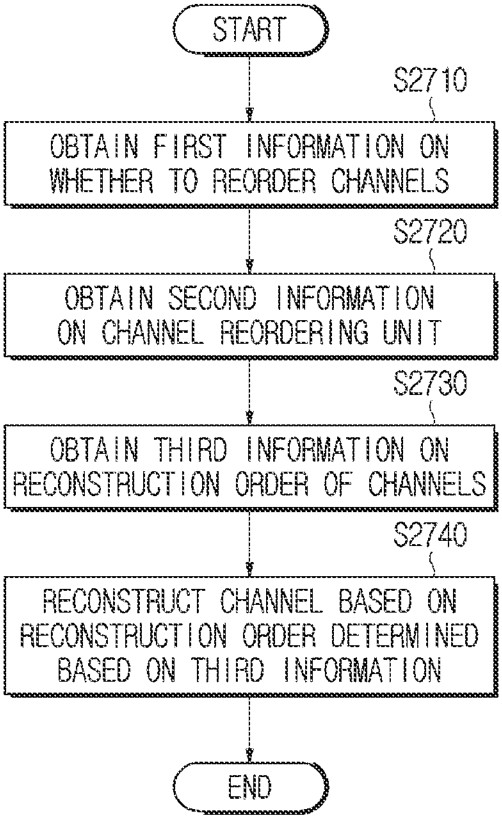
FIG. 27 is a flowchart illustrating a feature decoding method according to an embodiment of the present disclosure.

FIG. 27 is a flowchart illustrating a feature decoding method according to an embodiment of the present disclosure. The feature decoding method of FIG. 27 may be performed by the decoding apparatus of FIG. 1.

Referring to FIG. 27, the decoding apparatus may acquire, from a bitstream, first information about whether to reorder a plurality of channels included in a current feature map (e.g., Feature_channel_reordering_flag) (S2710).

Based on the first information indicating that the plurality of channels are reordered, the decoding apparatus may acquire, from the bitstream, second information about the reordering unit of the plurality of channels (e.g., Picture level_channel_reordering_flag, Group_level_channel_reordering_flag) (S2720).

The decoding apparatus may acquire, from the bitstream, third information about the reconstruction order of the plurality of channels (e.g., Number_of_group_channel, Feature channel order_count), based on the reordering unit of the plurality of channels determined based on the second information (S2730).

Then, the decoding apparatus may reconstruct the plurality of channels based on the reconstruction order of the plurality of channels determined based on the third information (S2740).

In one embodiment, the reordering unit may include a picture unit, a feature group unit, and a channel unit.

In one embodiment, based on the reordering unit of the plurality of channels being determined in the picture units, the third information may be acquired from a first parameter set (e.g., Feature_picture_parameter_set) at the picture level included in the bitstream.

In one embodiment, based on the reordering unit of the plurality of channels being determined in the feature group units, the third information may be acquired from a second parameter set (e.g., Feature_group parameter_set) at the feature group level included in the bitstream.

In one embodiment, based on the reordering unit of the plurality of channels being determined on the channel units, the third information may be acquired from a third parameter set (e.g., Feature_parameter_set) at the feature level included in the bitstream.

In one embodiment, at least one first block included in the plurality of channels may be reconstructed based on intra prediction, and the intra prediction may be performed based on already reconstructed reference samples included in a channel different from the first block.

In one embodiment, at least one second block included in the plurality of channels may be reconstructed based on inter prediction, and the inter prediction may be performed based on an already constructed reference block included in a channel different from the second block.

In one embodiment, the inter prediction may be performed based on a prediction information candidate (PIC) list including the reference block as an inter-channel candidate.

In one embodiment, the prediction information candidate (PIC) list may further include an already reconstructed reference block included in the same channel as the second block as a spatial candidate, and the number of spatial candidates may be determined by the number of inter-channel candidates.

According to the feature encoding/decoding method described above with reference to FIGS. 26 and 27, the channels of the feature/feature map may be reordered based on inter-channel correlation (or similarity) for encoding/decoding. Since channels adjacent to each other within the reordered channels have high correlation, complexity can be reduced and coding efficiency can be improved. Additionally, channel reordering-related information may be encoded/signaled hierarchically/adaptively at the feature sequence level, picture level, feature group level, and/or feature level. Accordingly, signaling overhead can be reduced and coding flexibility can be further improved. Additionally, inter-channel intra prediction and inter-channel intra prediction are provided, so that coding efficiency and prediction accuracy can be further improved.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Embodiments described in the present disclosure may be implemented and performed on a processor, microprocessor, controller, or chip. For example, the functional units shown in each drawing may be implemented and performed on a computer, processor, microprocessor, controller, or chip. In this case, information for implementation (e.g., information on instructions) or algorithm may be stored in a digital storage medium.

In addition, the decoder (decoding apparatus) and the encoder (encoding apparatus), to which the embodiment(s) of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, an argument reality (AR) device, a video telephony video device, a transportation terminal (e.g., vehicle (including autonomous vehicle) terminal, robot terminal, airplane terminal, ship terminal, etc.) and a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like Additionally, a processing method to which the embodiment(s) of the present disclosure is applied may be produced in the form of a program executed by a computer and stored in a computer-readable recording medium. Multimedia data having a data structure according to the embodiment(s) of this document may also be stored in a computer-readable recording medium. Computer-readable recording media include all types of storage devices and distributed storage devices that store computer-readable data. Computer-readable recording media include, for example, Blu-ray Disc (BD), Universal Serial Bus (USB), ROM, PROM, EPROM, EEPROM, RAM, CD-ROM, magnetic tape, floppy disk, and optical data storage device. Additionally, computer-readable recording media include media implemented in the form of carrier waves (e.g., transmission via the Internet). Additionally, the bitstream generated by the encoding method may be stored in a computer-readable recording medium or transmitted through a wired or wireless communication network.

Additionally, the embodiment(s) of the present disclosure may be implemented as a computer program product by program code, and the program code may be executed on a computer by the embodiment(s) of the present disclosure. The program code may be stored on a carrier readable by a computer.

Figure 28:
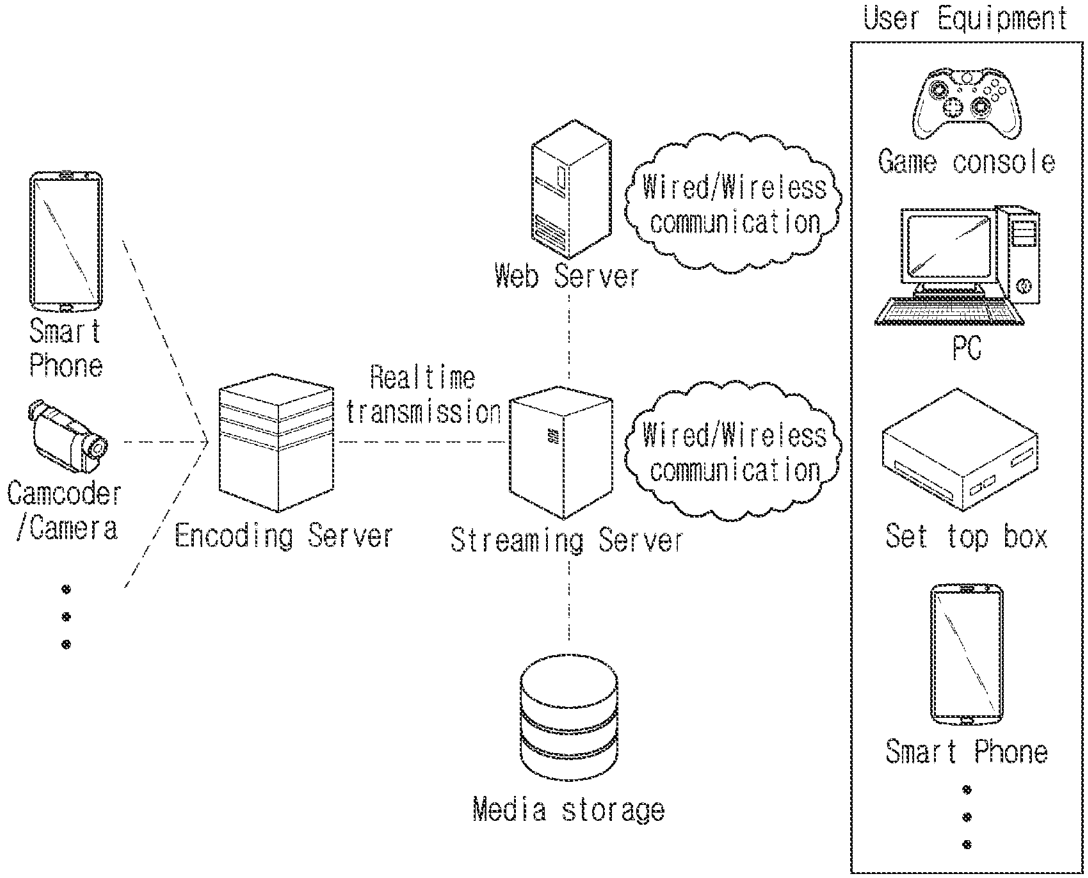
FIG. 28 is a view showing an example of a content streaming system to which embodiments of the present disclosure are applicable.

FIG. 28 is a view illustrating an example of a content streaming system to which embodiments of the present disclosure are applicable.

Referring to FIG. 28, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as srnartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server ma deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

Figure 29:
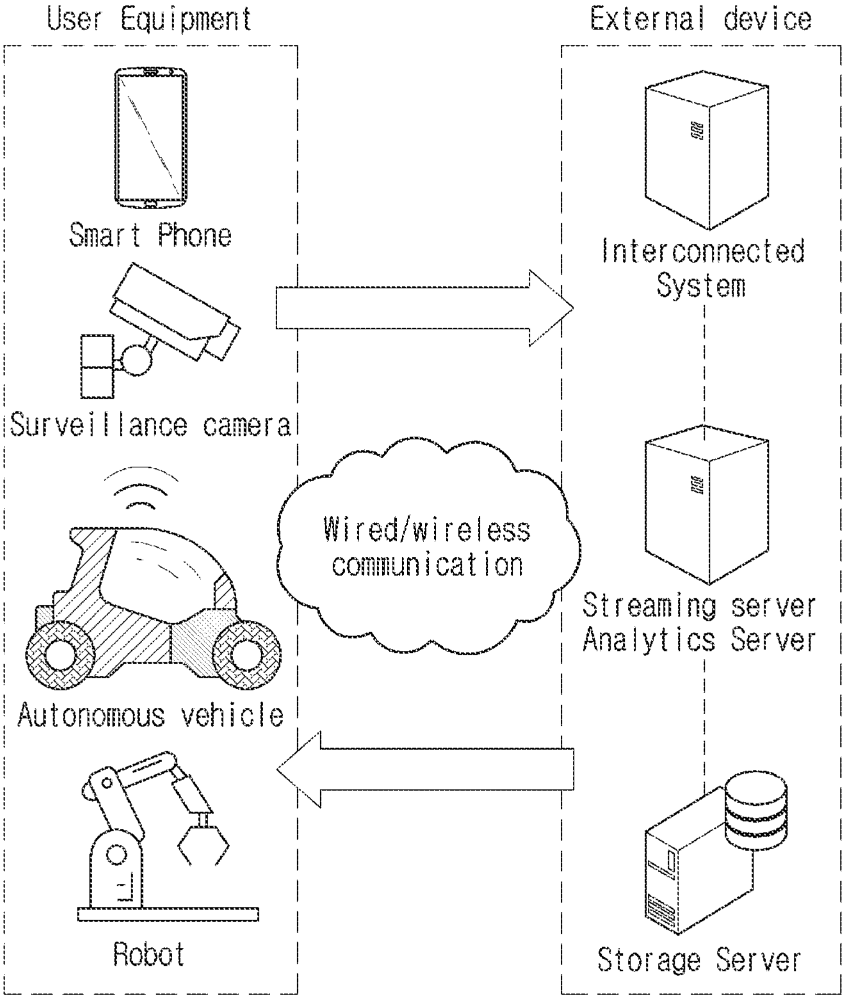
FIG. 29 is a view showing another example of a content streaming system to which embodiments of the present disclosure are applicable.

FIG. 29 is a diagram illustrating another example of a content streaming system to which embodiments of the present disclosure are applicable.

Referring to FIG. 29, in an embodiment such as VCM, a task may be performed in a. user terminal or a task may be performed in an external device (e.g., streaming server, analysis server, etc.) according to the performance of the device, the user's request, the characteristics of the task to be performed, etc. In this way, in order to transmit information necessary to perform a task to an external device, the user terminal may generate a bitstream including information necessary to perform the task (e.g., information such as task, neural network and/or usage) directly or through an encoding server.

In an embodiment, the analysis server may perform a task requested by the user terminal after decoding the encoded information received from the user terminal (or from the encoding server). At this time, the analysis server may transmit the result obtained through the task performance back to the user terminal or may transmit it to another linked service server (e.g., web server). For example, the analysis server may transmit a result obtained by performing a task of determining a fire to a fire-related server. In this case, the analysis server may include a separate control server. In this case, the control server may serve to control a command/response between each device associated with the analysis server and the server. In addition, the analysis server may request desired information from a web server based on a task to be performed by the user device and the task information that may be performed. When the analysis server requests a desired service from the web server, the web server transmits it to the analysis server, and the analysis server may transmit data to the user terminal. In this case, the control server of the content streaming system may serve to control a command/response between devices in the streaming system. The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

The embodiments of the present disclosure may be used to encode or decode a feature/feature map.

What is claimed is:

1. A feature decoding method performed by a feature decoding apparatus, the feature decoding method comprising:

obtaining, from a bitstream, first information on whether to reorder a plurality of channels included in a current feature map;

obtaining second information on a reordering unit of the plurality of channels from the bitstream, based on the first information specifying that the plurality of channels are reordered;

determining the reordering unit of the plurality of channels based on the second information, the reordering unit being determined to be one of a picture unit, a feature group unit, or a channel unit;

obtaining third information on a reconstruction order of the plurality of channels from the bitstream, based on the reordering unit of the plurality of channels; and reconstructing the plurality of channels based on the reconstruction order of the plurality of channels determined based on the third information, wherein reconstructing the plurality of channels comprises generating at least one first block included in a first channel among the plurality of channels based on inter prediction, and wherein the inter prediction is performed based on a prediction information candidate (PIC) list including at least one first reference block as inter-channel candidates, the at least one first reference block being included in a channel other than the first channel.

2. The feature decoding method of claim 1, wherein the third information is obtained, based on the reordering unit of the plurality of channels being determined to be the picture unit, from a first parameter set at a picture level included in the bitstream.

3. The feature decoding method of claim 1, wherein the third information is obtained, based on the reordering unit of the plurality of channels being determined to be the feature group unit, from a second parameter set at a feature group level included in the bitstream.

4. The feature decoding method of claim 1, wherein the third information is obtained, based on the reordering unit of the plurality of channels being determined to be the channel unit, from a third parameter set at a feature level included in the bitstream.

5. The feature decoding method of claim 1, wherein the prediction information candidate (PIC) list further comprises at least one second reference block included in a same channel as the at least one first block as spatial candidates, and wherein the number of spatial candidates is determined based on the number of inter-channel candidates.

6. A feature encoding method performed by a feature encoding apparatus, the feature encoding method comprising:

determining whether to reorder a plurality of channels included in a current feature map;

determining a reordering unit of the plurality of channels based on the plurality of channels being determined to be reordered, the reordering unit being determined to be one of a picture unit, a feature group unit, or a channel unit;

reordering the plurality of channels based on the determined reordering unit; and encoding the plurality of channels and information related to the reordering, wherein the information related to the reordering comprises first information on whether to reorder the plurality of channels, second information on the determined reordering unit and third information on an order before the reordering of the plurality of channels, wherein encoding the plurality of channels comprises generating at least one first block included in a first channel among the plurality of channels based on inter prediction, and wherein the inter prediction is performed based on a prediction information candidate (PIC) list including at least one first reference block as inter-channel candidates, the at least one first reference block being included in a channel other than the first channel.

7. The feature encoding method of claim 6, wherein the third information is encoded in a parameter set at a level determined based on the reordering unit.

8. A method of transmitting a bitstream, comprising:

determining whether to reorder a plurality of channels included in a current feature map;

determining a reordering unit of the plurality of channels based on the plurality of channels being determined to be reordered, the reordering unit being determined to be one of a picture unit, a feature group unit, or a channel unit;

reordering the plurality of channels based on the determined reordering unit;

encoding the plurality of channels and information related to the reordering to generate the bitstream; and transmitting the bitstream, wherein the information related to the reordering comprises first information on whether to reorder the plurality of channels, second information on the determined reordering unit and third information on an order before the reordering of the plurality of channels, wherein encoding the plurality of channels comprises generating at least one first block included in a first channel among the plurality of channels based on inter prediction, and wherein the inter prediction is performed based on a prediction information candidate (PIC) list including at least one first reference block as inter-channel candidates, the at least one first reference block being included in a channel other than the first channel.

* * * * *